United States Patent [19]

Bittar

[11] 4,323,142
[45] Apr. 6, 1982

[54] DYNAMICALLY REEVALUATED ELEVATOR CALL ASSIGNMENTS

[75] Inventor: Joseph Bittar, Simsbury, Conn.

[73] Assignee: Otis Elevator Company, Farmington, Conn.

[21] Appl. No.: 99,945

[22] Filed: Dec. 3, 1979

[51] Int. Cl.³ .............................................. B66B 1/18
[52] U.S. Cl. ................................................ 187/29 R
[58] Field of Search ......................................... 187/29

[56] References Cited

U.S. PATENT DOCUMENTS 3,851,733 12/1974 Sackin et al. ........................... 187/29
4,046,228 9/1977 Powell ................................... 187/29

*Primary Examiner*—J. V. Truhe
*Assistant Examiner*—W. E. Duncanson, Jr.
*Attorney, Agent, or Firm*—M. P. Williams

[57] ABSTRACT

An elevator control system employs a microprocessor-based group controller which communicates with the cars of the elevator system to determine the condition of the cars, and responds to hall calls registered at a plurality of landings in the building serviced by the cars under control of the group controller, on a cyclic basis which recurs several times per second, to assign every unanswered hall call to a car deemed best suited for response to that call, in each cycle, based upon the information provided by the car to the group controller within that cycle of operation. In any cycle in which a call is assigned to a car other than a car to which the call had previously been assigned, the assignment of the call to the previous car is nullified. At the end of each cycle, any car which indicates that its committable position coincides with the floor of a hall call which has been assigned to it will receive a stop command. In the assignment of calls to cars, preference is given to any car which previously had a call, although the preference is relative and not absolute. Exemplary elevator apparatus, signal processing apparatus, and logic flow diagrams are disclosed to illustrate the specific manner of assigning calls to cars on a continuously updated basis, and to illustrate the environment in which the invention may be practiced.

7 Claims, 14 Drawing Figures

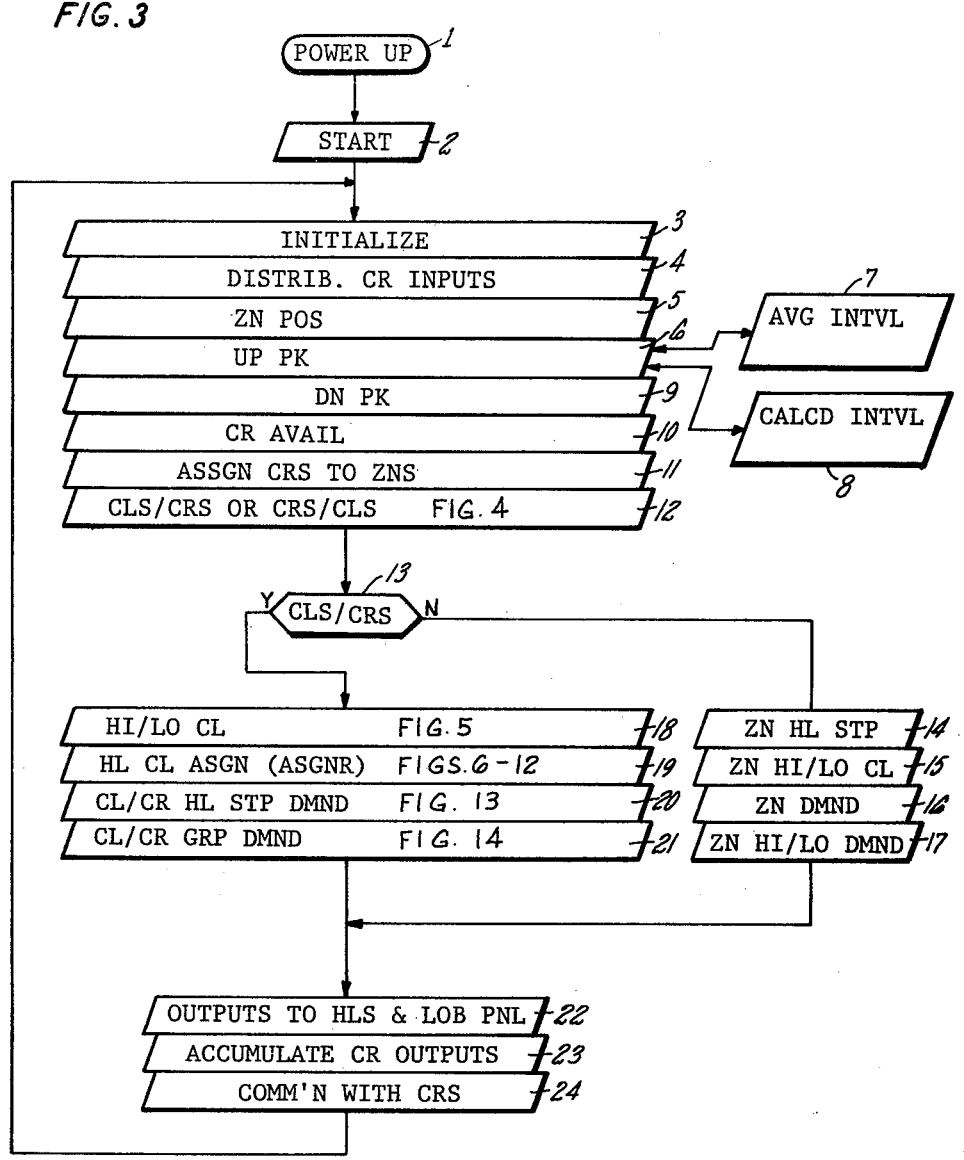

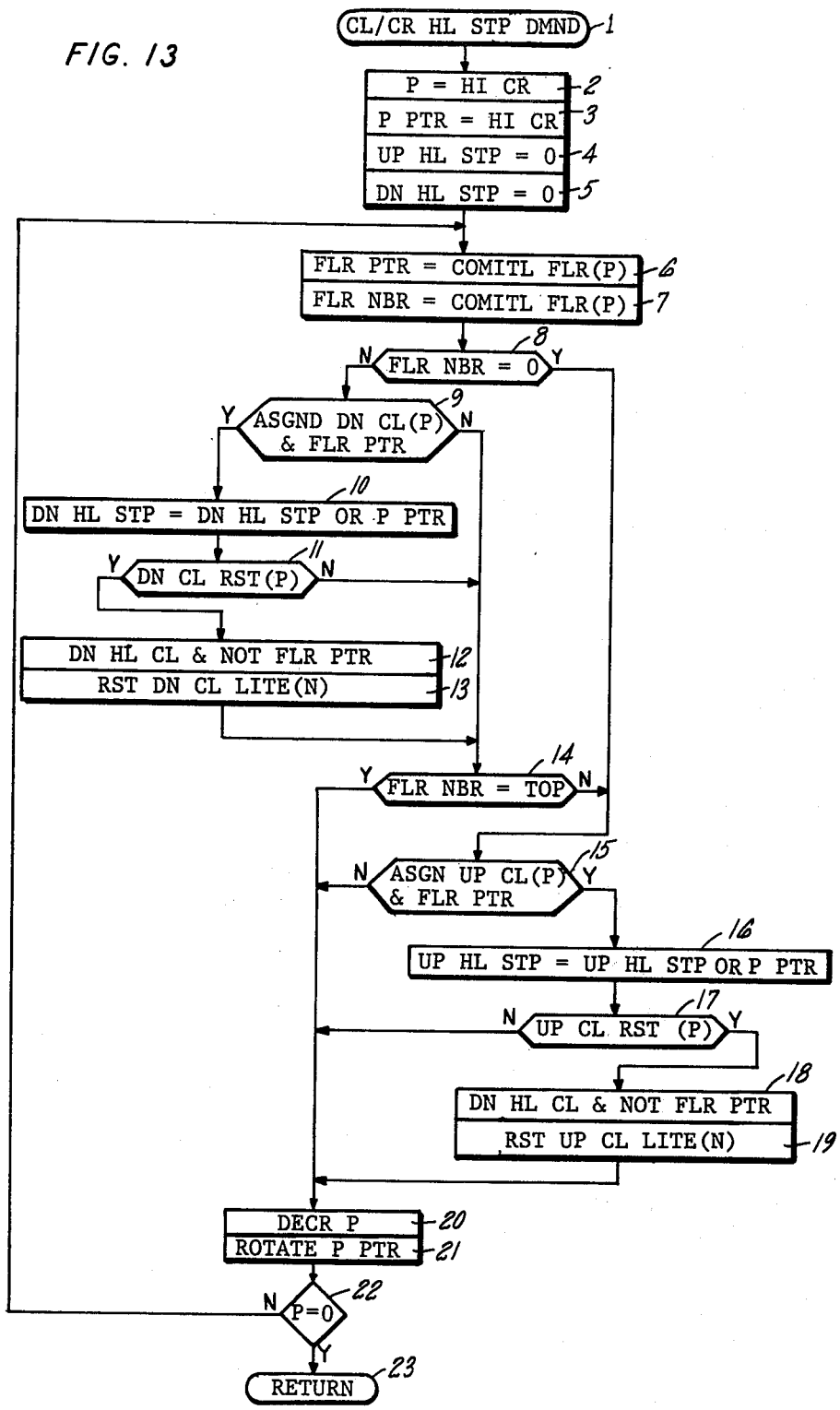

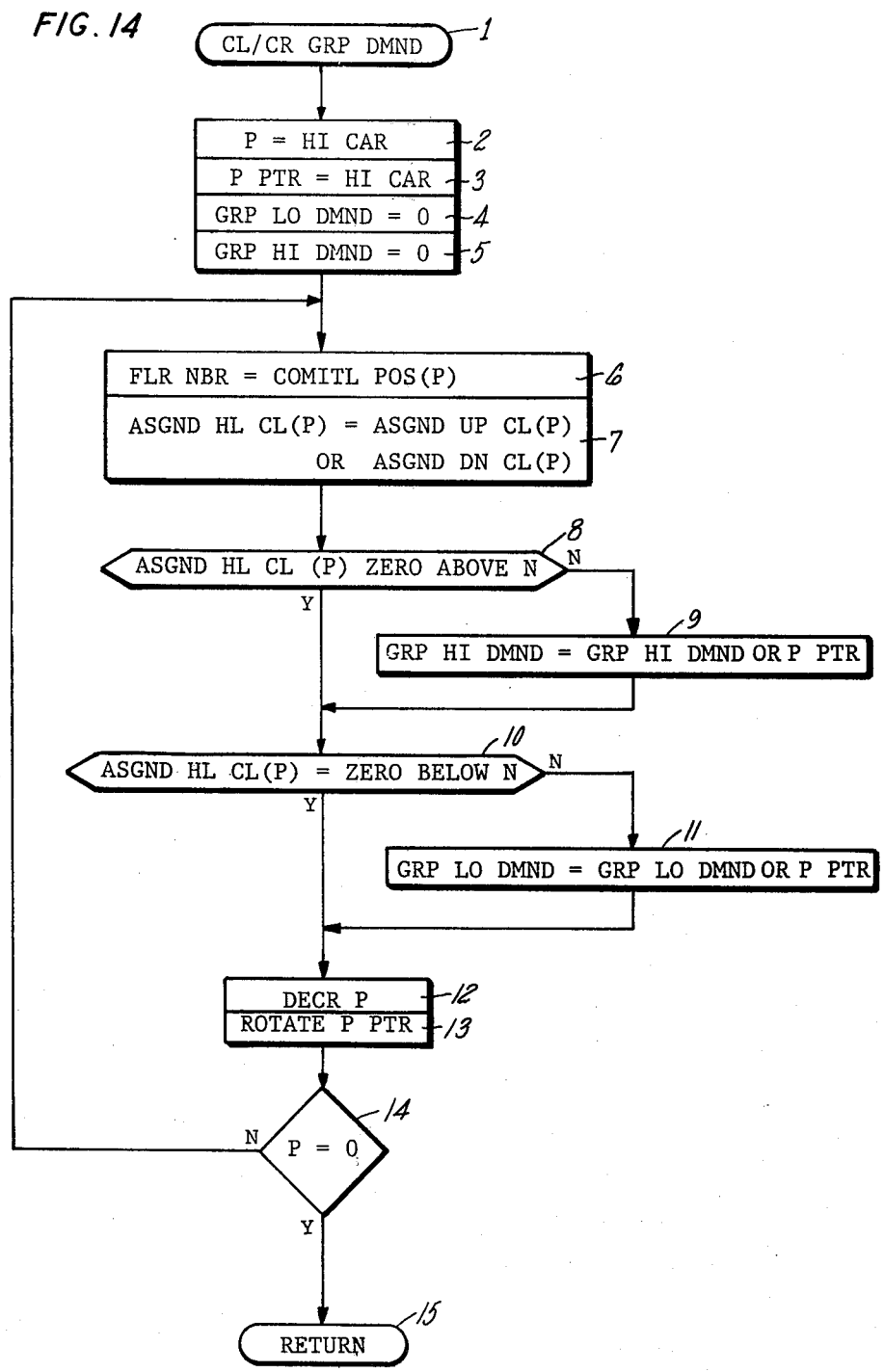

DYNAMICALLY REEVALUATED ELEVATOR CALL ASSIGNMENTS

1. Technical Field

This invention relates to elevator systems, and more particularly to the response to hall calls by a selected one of a group of elevators serving floor landings of a building in common, on a continuously updated basis.

Background Art

As elevator systems have become more sophisticated, including a large number of elevators operating as a group to service a large number of floors, the need developed for determining the manner in which calls for service in either the up or down direction registered at any of the floor landings of the building are to be answered by the respective elevator cars. The most common form of elevator system group control divides the floors of the building into zones, there being one or several floors in each zone, there being approximately the same number of zones as there are cars in the elevator system which can respond to group-controlled service of floor landing calls. Typical operation of such systems forces a car into any zone which does not have an elevator in it, and causes the car to attempt to respond to all the calls registered within the zone. However, the answering of any calls by the car, and the demands made by the passengers in registering car calls will normally carry the car outside of the zone; also, if the car commences traveling upwardly to answer up calls, it is unavailable to answer down calls. For that reason, systems operating under a zone-controlled mode of operation require a wide variety of additional features. For instance, if the calls in a zone are not answerable by the car in that zone, a car may be borrowed from another zone which has no calls; or, if one zone has no car in it, and no car is available for assignment to it, a zone of lesser importance might lose its car in favor of the zone under consideration. In the zone-controlled systems, it frequently occurs that some calls are not answered at all after an impermissible delay; therefore, such systems frequently have one or two modes of backup operation, ultimately resulting in a non-zone type of a flat command to a car to answer a call which has been registered for an impermissible time.

A more recent innovation has been the assignment of calls to cars by scanning all unassigned registered hall calls, comparing the location and direction of each such unassigned call with the present conditions of each of the cars, including the car location and direction of travel and the number of stops which the car will make between its present position and the position of the call, and assigning such call, absolutely, to the car which is estimated, in the first examination of each registered hall call, to be able to reach the floor landing of the hall call the quickest, based upon a scheme of operation which considers only approximate travel time and number of stops, along with car travel direction and car location. Such system, however, has a basic disadvantage that the conditions upon which the call has been made may change radically long before the call is answered by the car to which it has been assigned. For instance, a deliveryman may prop the door of the car open while he unloads packages, thus unduly delaying the car; or, at one of its in-between stops, the car may pick up an excessive number of passengers, who register a large number of hall calls that were not considered during the original assignment. In such case, as in the case of zone-controlled group systems, it is necessary to provide several levels of backup modes of operation. For instance, a first level backup mode may reenter the call for reassignment if it is not answered within a first predetermined time interval. And if that fails, and the call is still unanswered after a second, longer predetermined interval, then an absolute priority assignment of a car to answer that call may be required. Or, assigned calls may be reevaluated with respect to reassignment to other cars; but the comparison is made with respect to a previously determined response time for the first car to which the call was assigned. Such response time does not reflect current conditions appertaining to the previous car.

In either of these mode of operation, the facts that the primary mode of operation (zone or call assignment) is upset by anything other than an ideal pattern of traffic flow, necessarily requiring the backup modes, the change of the system from operating in the primary mode to backup mode resulting in further disruption, and further requirement for an additional backup mode, indicate that such systems fail to provide the desired service.

The zone type of operation does not take into account conditions within the building at any time. The assignment of calls-to-cars mode which has been known in the prior art assumes that it can anticipate conditions, assign calls on that basis, but is incapable of truly responding to actual conditions of the building insofar as assigning calls to cars is concerned. And, both types of systems are non-dynamic until something goes wrong (undue delay in responding to a call) and then shift into other non-dynamic modes, which still do not take into account the actual, current conditions in the building, but respond in a reactionary sort of a way to a condition which is deemed to be exceptional and unacceptable with respect to the principal mode of operation, thus causing still further disruption.

Both of the types of systems described hereinbefore are based upon the relationship between a registered call and a car, be that relationship an estimated time for response or a zone within which each is located. In neither of these cases are the actual current conditions of the system continuously reevaluated with respect to all unanswered hall calls.

DISCLOSURE OF INVENTION

Ojbects of the present invention include provision of an elevator control system in which all unanswered hall calls are assigned to cars on a current, dynamic basis, which takes into account actual, current conditions of the system.

According to the present invention, all unanswered hall calls registered at a plurality of landings in a multi-elevator system are repetitively assigned to cars on a cyclic basis recurring several times per second on the basis of conditions of each car relative to each such unanswered hall call, including the floor landing and direction of the unanswered hall call under consideration and including service to be performed by each car in advance of its ability to service the hall call under consideration, as indicated within each cycle in which such call is assigned to any car; after making the assignment of any hall call in any cycle, the assignment of such hall call made to any car in a cycle next preceding such cycle is removed from such car if the call is assigned to a different car during such cycle; at the end of each cycle, a stop command is issued to any car to which the committable floor position coincides with the landing of a hall call assigned to it.

In accordance with other aspects of the present invention, in each cycle of assigning calls to cars based upon conditions of the car relative to the call in question, preference is given to a car to which the call was assigned in a next preceding cycle; the preference may be based upon a weighted factor, when call assignments are made on the basis of weighted factors; if a weighted perference factor is employed in practicing the invention, the weighted preference factor may have a value on the same order of magnitude as it takes for an elevator to service from one to ten call landings, or it may be based on a reasonable time for a call to be unanswerable before desiring reassignment, or it may relate to a delay in servicing said call on the order of some part of a minute.

The present invention provides for assignment of calls to cars based upon current information, at a rate of updating which is serveral times faster than the rate at which an elevator car may pass a landing at high speed; the conditions considered in assigning the calls to the cars are current, being updated in every cycle; the assignment of a call to a car is based upon the best assignment possible, in any cycle, which recur several times per second, thereby ensuring that as conditions change, the assignment may also change, if desirable, to provide proper service to the call while at the same maintaining other factors of overall system response. Provision of preference for a call assigned to a car to be reassigned to the same car permits control over race conditions so that cars are not unnecessarily started nor alternatively having a hall call assigned to them, which only one ultimately will answer. The invention provides, for the first time, a total capability for rapidly updating hall call assignments without any of the adverse effects which would otherwise be created.

The foregoing and other objects, features and advantages of the present invention will become more apparent in the light of the following detailed description of an exemplary embodiment thereof, as illustrated in the accompanying drawing.

DESCRIPTION OF DRAWINGS

FIG. 3 is a simplified logic flow diagram of an overall group controller program which may incorporate and utilize the present invention;

FIG. 13 is a logic flow diagram of a call to car hall stop demand routine; and

FIG. 14 is a logic flow diagram of a call to car group demand subroutine.

BEST Mode for Carrying Out the Invention

Figure 1:
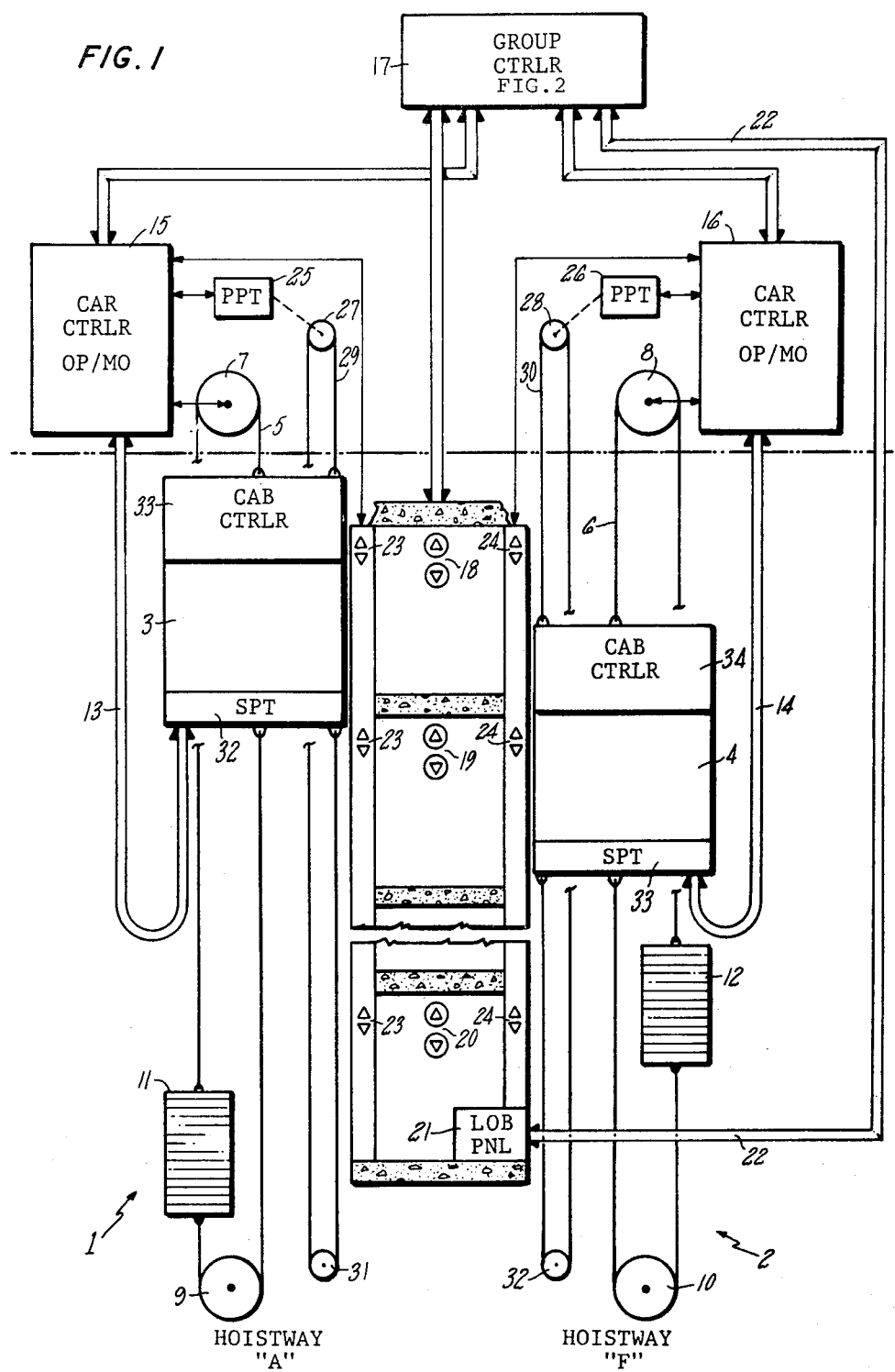
FIG. 1 is a simplified, schematic block diagram, partially broken away, of an elevator system in which the present invention may be incorporated.

A simplified description of a multi-car elevator system, of the type in which the present invention may be practiced, is illustrated in FIG. 1. Therein, a plurality of hoistways, HOISTWAY "A" 1 and HOISTWAY "F" 2 are illustrated, the remainder are not shown for simplicity. In each hoistway, an elevator car or cab 3, 4 is guided for vertical movement on rails (not shown). Each car is suspended on a rope 5, 6 which usually comprises a plurality of steel cables, that is driven either direction or held in a fixed position by a drive sheave/motor/brake assembly 7, 8, and guided by an idler or return sheave 9, 10 in the well of the hoistway. The rope 5, 6 normally also carries a counterweight 11, 12 which is typicaly equal to approximately the weight of the cab when it is carrying half of its permissable load.

Each cab 3, 4 is connected by a traveling cable 13, 14 to a corresponding car controller 15, 16 which is located in a machine room at the head of the hoistways. The car controllers 15, 16 provide operation and motion control to the cabs, as is known in the art. In the case of multi-car elevator systems, it has long been common to provide a group controller 17 which receives up and down hall calls registered on hall call buttons 18-20 on the floors of the buildings, allocates those calls to the various cars for response, and distributes cars among the floors of the building, in accordance with any one of several various modes of group operation. Modes of group operation may be controlled in part by a lobby panel 21 which is normally connected by suitable building wiring 22 to the group controller in multi-car elevator systems.

The car controllers 15, 16 also control certain hoistway functions which relate to the corresponding car, such as the lighting of up and down response lanterns 23, 24, there being one such set of lanterns 23 assigned to each car 3, and similar sets of lanterns 24 for each other car 4, designating the hoistway door where service in response to a hall call will be provided for the respective up and down directions.

The foregoing is a description of an elevator system in general, and, as far as the description goes thus far, is equally descriptive of elevator systems known to the prior art, and elevator systems incorporating the teachings of the present invention.

Although not required in the practice of the present invention, the elevator system in which the invention is utilized may derive the position of the car within the hoistway by means of a primary position transducer (PPT) 25, 26 which may comprise a quasiabsolute, incremental encoder and counting and directional interface circuitry of the type described in a commonly owned copending U.S. patent application of Marvin Masel et al. Ser. No. 927,242, filed on July 21, 1978, (a continuation of Ser. No. 641,798, filed Dec. 18, 1975), entitled HIGH RESOLUTION AND WIDE RANGE SHAFT POSITION TRANSDUCER SYSTEMS. Such transducer is driven by a suitable sprocket 27, 28 in response to a steel tape 29, 30 which is connected at both its ends to the cab and passes over an idler sprocket 31, 32 in the hoistway well. Similarly, although not required in an elevator system to practice the present invention, detailed positional information at each floor, for more door control and for verification of floor position information derived by the PPT 25, 26, may employ a secondary position transducer (SPT) 32, 33 of the type disclosed and claimed in a commonly owned copending U.S. application filed on Nov. 13 1979, by Fairbrother, Ser. No. 93,475. Or, if desired, the elevator system in which the present invention is practiced may employ inner door zone and outer door zone hoistway switches of the type known in the art.

The foregoing description of FIG. 1 is intended to be very general in nature, and to encompass, although not shown, other system aspects such as shaftway safety switches and the like, which have not been shown herein for simplicity, since they are known in the art and not a part of the invention herein.

All of the functions of the cab itself are directed, or communicated with, by means of a cab controller 33, 34 in accordance with the present invention, and may provide serial, time-multiplexed communications with the car controller as well as direct, hard-wired communications with the car controller by means of the traveling cables 13, 14. The cab controller, for instance, will monitor the car call buttons, door open and door close buttons, and other buttons and switches within the car; it will control the lighting of buttons to indicate car calls, and will provide control over the floor indicator inside the car which designates the approaching floor. The cab controller interfaces with load weighing transducers to provide weight information used in controlling the motion, operation, and door functions of the car. The load weighing may be in accordance with the invention described and claimed in commonly owned copending patent applications filed on Nov. 27, 1979, by Donofrio, Ser. No. 98,004 and by Games, Ser. No. 98,003 now abandoned. A most significant job of the cab controller 33, 34 is to control the opening and closing of the door, in accordance with demands therefore under conditions which are determined to be safe.

The makeup of the microcomputer systems, such as may be used in the implementation of the car controllers 15, 16, a group controller 17, and the cab controllers 33, 34, can be selected from readily available components or families thereof, in accordance with known technology as described in various commercial and technical publications. These include "An Introduction to Microcomputers, Volume II, Some Real Products" published in 1977 by Adam Osborne and Associates, Inc., Berkeley, California, U.S.A., and available from Sydex, Paris, France; Arrow International, Tokyo, Japan, L. A. Varah Ltd., Vancouver, Canada, and Taiwan Foreign Language Book Publishers Council, Taipei, Taiwan. And, "Digital Microcomputer Handbook", 1977-1978 Second Edition, published by Digital Equipment Corporation, Maynard, Massachusetts, U.S.A. And, Simpson, W. D., Luecke, G., Cannon, D. L., and Clemens, D. H., "9900 Family Systems Design and Data Book", 1978, published by Texas Instruments, Inc., Houston, Texas, U.S.A. (U.S. Library of Congress Catalog No. 78-058005). Similarly, the manner of structuring the software for operation of such computers may take a variety of known forms, employing known principles which are set forth in a variety of publications. One basic fundamental treatise is "The Art of Computer Programming", in seven volumes, by the Addison-Wesley Publishing Company, Inc., Reading, Massachusetts, and Menlo Park, California, U.S.A.; London, England; and Don Mills, Ontario, Canada (U.S. Library of Congress Catalog No. 67-26020). A more popular topical publication is "EDN Microprocessor Design Series" published in 1975 by Kahners Publishing Company (Electronic Division News), Boston, Massachusetts, U.S.A. And a useful work is Peatman, J. B., "Microcomputer-Based Design" published in 1977 by McGraw Hill Book Company (worldwide), U.S. Library of Congress Catalog No. 76-29345.

The software structure for implementing the present invention, and peripheral features which may be disclosed herein, may be organized in a wide variety of fashions. However, utlizing the Texas Instruments' 9900 family, and suitable interface modules for working there with, an elevator control system of the type illustrated in FIG. 1, with separate controllers for the cabs, the cars, and the group, has been implemented utilizing real time interrupts, power on causing a highest priority interrupt which provides system initialization (above and beyond initiation which may be required in any given function of one of the controllers). And, it has employed an executive program which responds to real time interrupts to perform internal program functions and which reponds to communication-initiated interrupts from other controllers in order to process serial communications with the other controllers, through the control register unit function of the processor. The various routines are called in timed, interleaved fashion, some routines being called more frequently than others, in dependence upon the criticality or need for updating the functon performed thereby. Specifically, there is no function relating to elevatoring which is not disclosed herein that is not known and easily implemented by those skilled in the elevator art in the light of the teachings herein, nor is there any processor function not disclosed herein which is incapable of implementations using techniques known to those skilled in the processing arts, in the light of the teachings herein.

The invention herein is not concerned with the character of any digital processing equipment, nor is it concerned with the programming of such processor equipment; the invention is disclosed in terms of an implementation which combines the hardware of an elevator system with suitably-programmed processors to perform elevator functions, which have never before been performed. The invention is not related to performing with microprocessors that which may have in the past been performed with tradiational relay/switch circuitry nor with hard wired digital modules; the invention concerns new elevator functions, and the disclosure herein is simply illustrative of the best mode contemplated for carrying out the invention, but the invention may also be carried out with other combinations of hardware and software, or by hardware alone, if desired in any given implementation thereof.

Communication between the cab controllers 33, 34, and the car controllers 15, 16 in FIG. 1 is by means of the well known traveling cable in FIG. 1. However, because of the capability of the cab controllers and the car controllers to provide a serial data link between themselves, it is contemplated that serial, time division multiplexed communication, of the type which has been known in the art, will be used between the car and cab controllers. In such case, the serial communication between the cab controllers 33, 34, and the car controllers 15, 16 may be provided via the communication register unit function of the TMS-9900 microprocessor integrated circuit chip family, or equivalent. However, multiplexing to provide serial communications between the cab controller and the car controller could be provided in accordance with other teachings, known to the prior art, if desired.

Figure 2:
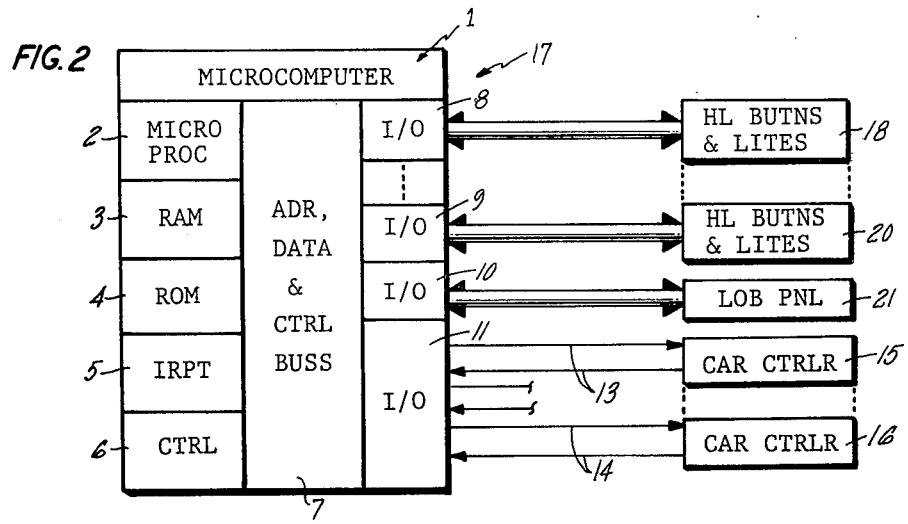
FIG. 2 is a simplified, schematic block diagram of a car controller, which may be employed in the system of FIG. 1, and in which the invention may be implemented.

Referring now to FIG. 2, a group controller 17 is illustrated simply, in a very general block form. The group controller is based on a microcomputer 1 which may take any one of a number of well-known forms. For instance, it may be built up of selected integrated circuit chips offered by a variety of manufacturers in related series of integrated circuit chips, such as the Texas Instruments 9900 Family. Such a microcomputer 1 may typically include a microprocessor (a central control and arithmetic and logic unit) 2, such as a TMS 9900 with a TIM 9904 clock, random access memory 3, read only memory 4, an interrupt priority and/or decode circuit 5, and control circuits, such as address/operation decodes and the like. The microcomputer 1 is generally formed by assemblage of chips 2–6 on a board, with suitable plated or other wiring so as to provide adequate address, data, and control busses 7, which interconnect the chips 2–6 with a plurality of input/output (I/O) modules of a suitable variety 8–11. The nature of the I/O modules 8–11 depends on the functions which they are to control. It also depends, in each case, on the types of interfacing circuitry which may be utilized outboard therefrom, in controlling or monitoring the elevator apparatus to which the I/O is connected. For instance, the I/Os 8–10 being connected to hall call buttons and lamps and to switches and indicators may simply comprise buffered input and buffered output, multiplexer and demultiplexer, and voltage and/or power conversion and/or isolation so as to be able to sense hall or lobby panel button or switch closure and to drive lamps with a suitable power, whether the power is supplied by the I/O or externally.

An I/O module 11 provides serial communication over current loop lines 13, 14 (FIG. 2) with the car controllers 15, 16 (FIGS. 1 and 2). These communications include commands from the group controller to the cars such as higher and lower demand, stop commands, cancelling hall calls, preventing lobby dispatch, and other commands relating to optional features, such as express priority and the like. The group controller initiates communication with each of the car controllers in succession, and each communication operation includes receiving response from the car controllers, such as in the well known "handshake" fashion, including car status and operation information such as is the car in the group, is it advancing up or down, its load status, its position, whether it is under a go command or is running, whether its door is fully opened or closed, and other conditions. As described hereinbefore, the meanings of the signals which are not otherwise explained hereinafter, the functions of the signals which are not fully explained hereinafter, and the manner of transferring and utilizing the signals, which are not fully described hereinafter, are all within the skill of the elevator and signal processing arts, in the light of the teachings herein. Therefore, detailed description of any specific apparatus or mode of operation thereof to accomplish these ends in unnecessary and not included herein.

Overall program structure of a group controller, based upon a data processing system, in which the present invention may be practiced, is illustrated in FIG. 3 and is reached through a program entry point 1 as a consequence of power up causing the highest priority interrupt, in a usual fashion. Then a start routine 2 is run in which all RAM memory is cleared, all group outputs are set to zero, and building parameters (which tailor the particular system to the building, and may include such things as floor rise and the like) are read and formatted as necessary, utilizing ordinary techniques. Then the program will advance into the repetitive portion thereof, which, in accordance with the embodiment described herein, may be run on the order of every 200 milliseconds. This portion of the program commences with an initialize routine 3 in which all forcing (FORC) and all inhibit or cancel (INH) functions are cleared from memory; field adjustable variables are read and formatted as necessary; the status of each car is read and formatted as necessary; and all the hall calls are scanned, and corresponding button lights for sensed hall calls are lit. Then, all inputs obtained by communication with the cars are distributed to the various maps and other stored parameter locations relating thereto in a routine 4. Then, a zone position routine 5 (described more fully with respect to FIG. 4 of a commonly owned, copending U.S. patent application filed on even date herewith by Bittar and Mendelsohn, Ser. No. 99,394 is performed to identify the cars in each zone and to identify the zone in which each car is. Then, an up peak routine 6, including an average interval subroutine 7 and a calculated interval subroutine 8, which are described more fully with respect to FIGS. 5–9 of said Bittar and Mendelsohn application, is performed to determine if there is up peak traffic, and if so to perform the various functions required, depending upon the level of traffic involved. Then, a down peak subroutine 9 may be performed to see if two cars in succession have reached the lobby with at least a half of load, and if so, to establish down peak zone operation by setting a down peak cars map to all ones, forcing cars that are in the lobby away from the lobby, and forcing a zone group higher demand to ensure that cars will distribute themselves upwardly to the top of the building in order to bring more passengers down. Since this forms no part of the present invention, but is simply part of the overall environment in which the invention may be practiced, further description thereof is not given herein.

In FIG. 3, a car availability routine 10 updates the status of cars that are available to satisfy demand in the group, that are available for assignment to zones, and that are available to occupy zones, as is described more fully with respect to FIG. 10 of said Bittar and Mendelsohn application, in preparation of performing the assigning cars to zones routine 11, which is described more fully hereinafter with respect to FIG. 11 of said application. Then the mode of operation, whether calls should be assigned to cars or cars should be assigned to calls, is established in a calls-to-cars or cars-to-calls subroutine 12, which is described more fully hereinafter with respect to FIG. 4. If calls are to be assigned to cars as determined in a test 13, then the program continues with a plurality of routines which assign cars to calls and create response of the cars to the assignments, utilizing relative system response as the criteria. On the other hand, if cars are to be assigned to calls, test 13 will be negative and a plurality of routines are performed, which assign cars to calls, in a type of elevator group control in which the building and therefore the calls therein are divided into a plurality of zones, as is known to the art.

The assignment of cars to calls as a consequence of cars being assigned to zones, and zone response to calls being indicated (such as during up peak or down peak traffic) is accomplished by creating demand for unoccupied zones so that cars can be assigned to them (except when cars are all forced into the assigned condition during clock up peak), determining the highest and lowest calls in the zone, generating group higher and lower demand signals for the cars to reach the calls in their zones, or to reach an unoccupied zone if a car is unassigned, or to respond to forced calls, such as lobby calls during up peak traffic.

Since these functions are generally known, and form no part of the present invention, detail logic flowcharts for achieving them are not shown herein, but the nature thereof will be described.

Specifically, in FIG. 3, a zone hall stop routine 14 updates a current map of cars requiring up hall stops or down hall stops at their committable positions, and resets hall calls (and corresponding button lights) of those indicated by the cars to have been answered. A zone high and low call routine 15 determines, for each zone of the building, the floor at which the highest and lowest hall calls are currently extant and require service. A zone demand routine 16 determines all the cars below the highest empty zone and creates higher demand to try and drive any of them that are available upward to fill the zone, and similarly determines all the cars above the lowest empty zone and creates zone demand to attempt to drive any available cars downward into the lowest empty zone. And a zone high/low demand routine 17 creates higher and lower zone demand within the respective zones to reach the highest and lowest hall calls, and then creates maps of higher and lower demand for cars in the zones to answer the calls, for unassigned cars to answer zone demands to fill empty zones, and to respond to forcing of demands or forcing of lobby calls. These routines are not new, and need not be described further, particularly in the light of similar routines described herein. They provide, however, a more complete description of the environment of the invention.

In FIG. 3, if test 13 is affirmative, then calls are assigned to cars by first performing a high/low call routine 18 which finds the highest and lowest car calls, up hall calls, and/or down hall calls in the entire building, as described more fully with respect to FIG. 5 hereinafter. Then, a hall call assignment routine 19 (FIGS. 6–12) assigns all up hall calls and all down hall calls to cars, in dependence on a plurality of variables, employing the relative system response factors of the invention described and claimed in a commonly owned copending U.S. patent application filed on the even date herewith by Bittar, Ser. No. 99,790. In the routine 19, each call is assigned to a specific car for response; but in accordance with said invention, the calls are updated every time the routine of FIG. 3 is performed, thereby allowing improved assignments in accordance with changes in conditions. Since the routine of FIG. 3 is performed, in the embodiment herein, every 200 milliseconds or the like, this means that conditions that change in much less time than it takes a high-speed run past a floor without a stop, can be included in improving the assignment of calls to specific cars. This is an important aspect of the present invention: updating hall call assignments several times per second based upon information which is updated several times per second. The results of the calls to cars assignment which take place in the routine 19 are utilized in a call/car hall stop demand routine 20, which is described more fully hereinafter with respect to FIG. 13. And the running of all cars to which calls are assigned is controlled by a call/car group demand routine 21, which is described more fully hereinafter with respect to FIG. 14.

In FIG. 3, regardless of whether calls are assigned to cars or cars are assigned to calls, the results of all of the routines on FIG. 3 are outputted appropriately once in each cycle. For instance, an outputs to halls and lobby panel routine 22 may provide direct discrete outputs, operate lights and the like, as is deemed appropriate in the various hallways and at the lobby panel. An accumulate car outputs routine 23 sorts out the information relating to respective cars into car format, in preparation of performing a communication with the cars routine 24, which may utilize the serial (communication register unit) method of providing each car with updated information, or may provide it over parallel data buses, if desired. And then, the routine repeats by again commencing through the initialize routine 3, as described hereinbefore.

Figure 4:
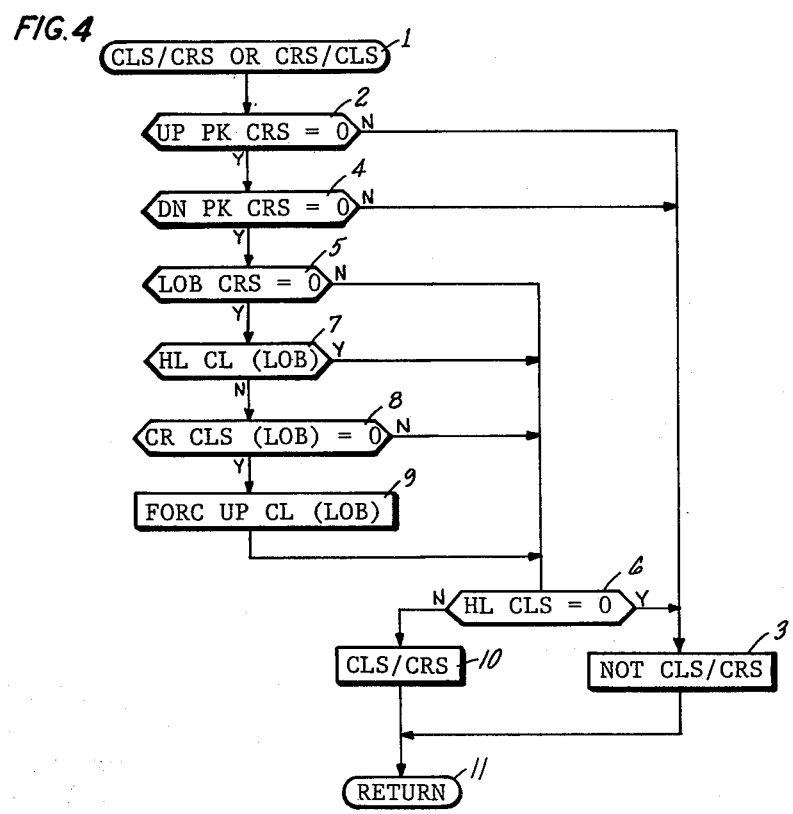
FIG. 4 is a logic flow diagram of a calls-to-cars or cars-to-calls routine.

Referring now to FIG. 4, the calls-to-cars or cars-to-calls subroutine is reached through an entry point 1. A test 2 determines if up peak clock is involved by examining all the bits of the up peak cars map. If all the bits are zeros, test 2 is affirmative, indicating that up peak operation for assignment of cars to calls has not been initiated. On the other hand, if test 2 is negative, then up peak mode of assigning cars to calls is required and a step 3 will ensure that the calls-to-cars flag is reset, or zero, which will command zone operation in the routines 14–17 (FIG. 3) to handle the up peak. Similarly, if a test 3 determines that the map of down peak cars is not all zero, then test 3 will ensure that operation will proceed through the zone routines 14–17 of FIG. 3 in order to handle the up peak mode of operation. But if steps 2 and 4 are affirmative, then no peak operation is required.

In FIG. 4, a test 5 determines if there are any lobby cars by sensing whether the map of lobby cars is all zero. If it is not, then there is at least one car at the lobby so that a test 6 will determine whether there are any hall calls or not. This is done by examining a map of all hall calls to see if it is zero. If it is, there are no hall calls, so step 3 will call for assignment of cars to calls by ensuring that the calls-to-cars flag is reset. This will cause the zone routines 14–17 (FIG. 3) to come into play and create zone demands to park all of the cars in a distributed fashion among the zones of the building. But if test 5 is negative, there is no car at the lobby. Then, a test 7 will determine if there is a hall call which will result in calling a car to the lobby. If not, a test 8 will determine if any car calls have been indicated for the lobby. The result of tests 5–8, is if there is no car and no call for a car to bring one to the lobby, is that a step 9 will add a lobby call to a map of forcing up calls, which will create, within the group control, an indication that a lobby call has been made. This is not an actual lobby call, and no light will be indicated at the lobby, unless the particular implementation of the invention provides for such. But it will cause the hall call assignment routine 19 (FIG. 3) to assign a car to the lobby so that there will be a car at the lobby if the cars are all parked (by virtue of there being no peak periods and no hall calls to serve, as indicated by tests 2, 4, and 6). And, this provides additional favoritism to the lobby in the assignment of calls to cars, as is described more fully with respect to the hall call assignment routine 19 (FIG. 3), hereinafter. And, because an up call is forced by step 9, the program proceeding thereafter through test 6 will cause a negative response to test 6 because the lobby up call which has been forced by step 9 will prevent step 6 from being affirmative. This causes a step 10 to set the calls-to-cars flag which is tested in test 13 of FIG. 3 and causes the calls-to-cars assignment method to be utilized, as described briefly hereinbefore. Since test 6 will always be negative when there is a lobby up call unanswered, any pass through step 9 or affirmative result of test 7 could lead directly to step 10, bypassing test 6, is desired.

In FIG. 4, assuming a first pass has determined that tests 2, 4, and 5 are affirmative, test 7 is negative and test 8 is affirmative, so that a lobby call is forced in step 9, a subsequent pass through this routine (such as 200 milliseconds later) will probably find that test 5 is still affirmative, meaning no car has reached the lobby. But step 7 will also be affirmative indicating that there is a hall call to the lobby. Therefore, test 6 will again be negative. This will continue until a car reaches the lobby, and the call/car hall stop demand routine 20 (FIG. 3) resets the lobby hall call (as is described more fully with respect to FIG. 13 hereinafter). At that time, test 5 will be negative because there will be a car at the lobby, and test 6 will be affirmative because the lobby call (having been answered) has been reset. With test 6 affirmative, step 3 will therefore cause reversion to the zone type of operation in which cars are assigned to calls. In any event, even when there are hall calls to be served, the routine of FIG. 4 will force calls for the lobby whenever there are no calls for the lobby and no cars at the lobby, so that the necessary preference for having lobby service will be effective. When the routine of FIG. 4 is completed, it returns to the main program of FIG. 3 through a return point 11.

Figure 5:
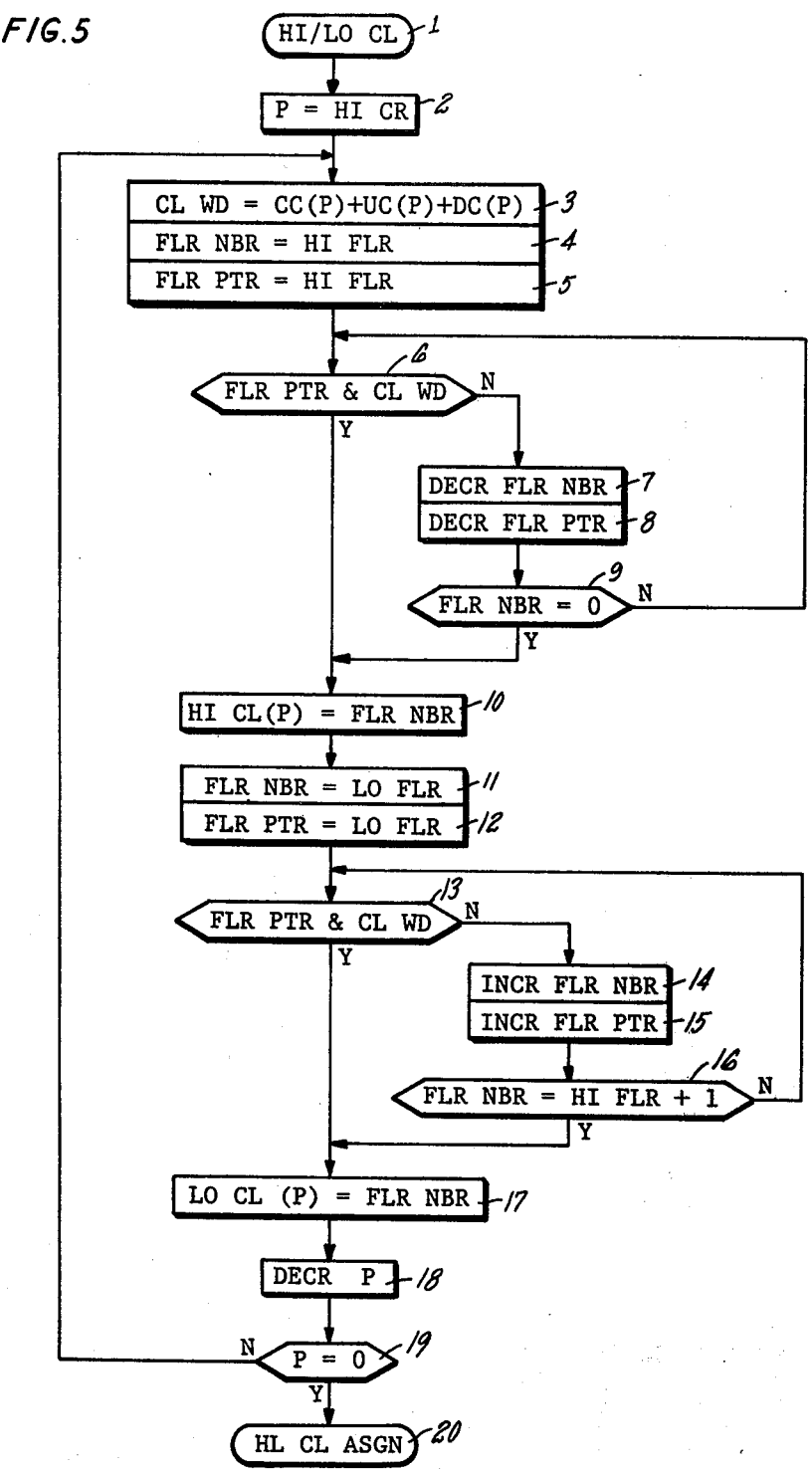
FIG. 5 is a logic flow diagram of a high/low call routine.

Conclusion of the routine of FIG. 4 will cause the high/low call routine of FIG. 5 to be reached through an entry point 1. This routine determines the floor where each car has its highest call at the present moment and the floor where each car has its lowest assigned call at the present moment. The routine starts by step 2 setting a P number to the highest numbered car in the building. Then step 3 provides an assigned call word as the logical OR of all the car calls, up hall calls, and down hall calls for car P. A floor number and floor pointer are set to the highest floor in the building in steps 4 and 5, and a test 6 determines whether the floor pointer coincides with any assigned call in the call word. If it does not, then the floor number and floor pointer are decremented in steps 7 and 8 and if a test 9 determines that the lowest floor has not yet been considered, test 6 will be repeated for the next floor. The first time that step 6 encounters an assigned call at the floor under consideration, since this is starting at the highest floor, this will be an indication of the highest call assigned to the car. Therefore, an affirmative result from step 6 will go directly to a step 10 where a number indicating the floor of the highest assigned call for car P is set equal to the current floor number. Then, steps 11 and 12 will set the floor number and floor pointer to the lowest floor in the building. And in a fashion similar to that described above, a test 13 until the first call for car P coincides with the floor pointer, steps 14 and 15 will increase the floor under consideration, and the process will be repeated until a test 16 indicates that the highest floor in the building has been given consideration. The first time that test 13 is affirmative, this indicates that the lowest floor for which the car P has an assigned call has been reached, so that a step 17 will set the lowest call for car P equal to the current floor number. Then the next lowest numbered car in the building is brought into consideration by step 18 decrementing the P number, and test 19 determining that the lowest car (car 1) has not had its consideration. But when test 19 is affirmative, the program is complete and a hall call assignment program is reached through a transfer point 20.

Figure 6:
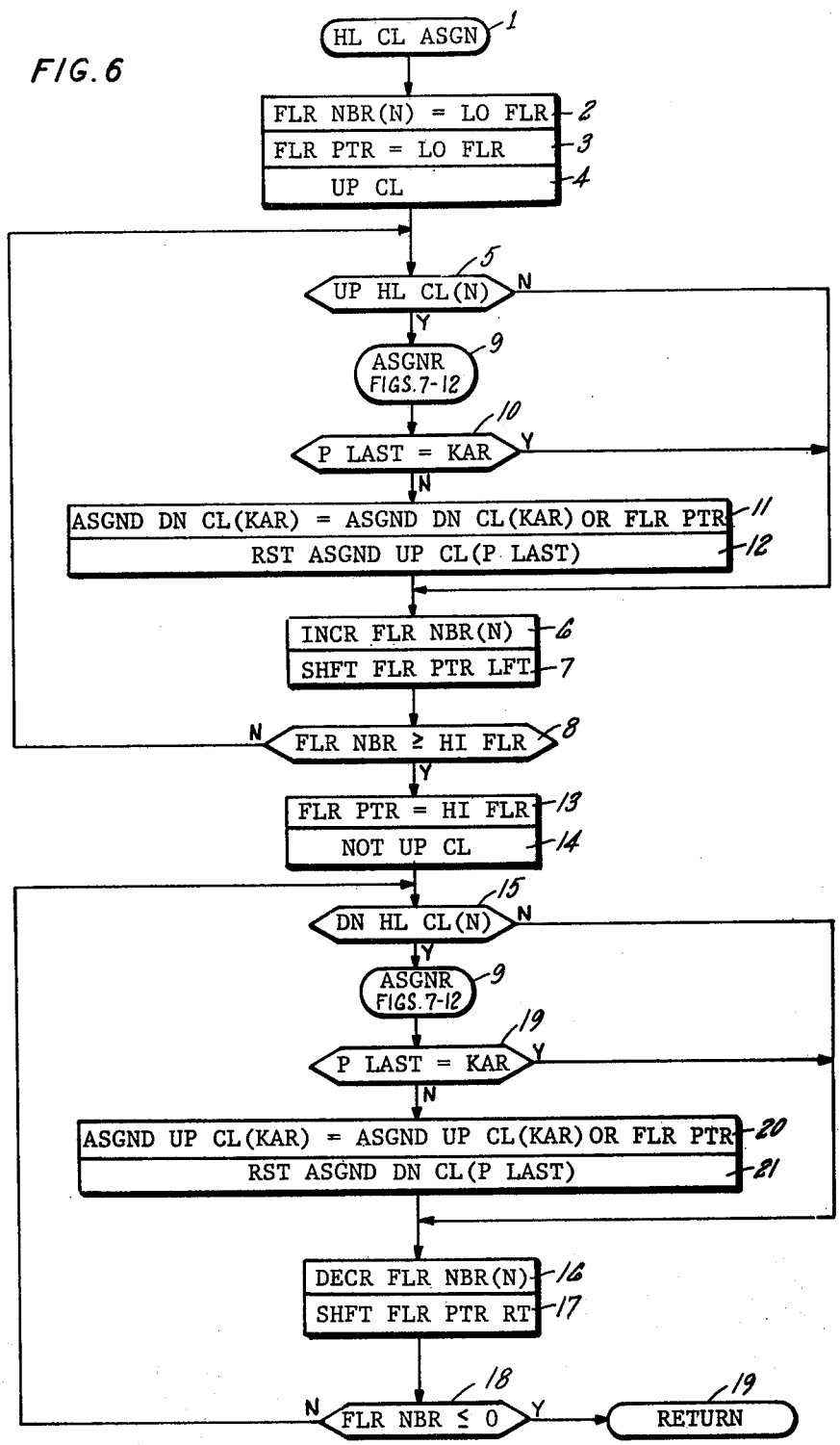
FIG. 6 is a logic flow diagram of a hall call assignment routine.

The hall call assignment routine of FIG. 6 is designed to assign specific calls to cars, in contrast to assigning cars to zones to pick up whichever calls may be there. As described more fully hereinafter, it is contemplated that the hall call assignment routine will be run on the order of five times per second, which means that as each car passes floors at the highest possible speed, calls may be assigned and reassigned four or five times. It also means that, the status of a car which is stopping, stopped, or starting up, including the status of its doors as being open, opening, closed, or closing, can be utilized in updating call allocations on a very rapid basis, for best overall system response.

In FIG. 6, steps 2 and 3 set the lowest floor as the one to be considered by establishing a floor number and floor pointer as the lowest floor. And consideration of up calls is designated by setting an up call flag in step 4. In step 5, the determination of whether there is an up hall call outstanding at floor N is made. If not, the further functions for up calls with respect to this floor are bypassed, a step 6 will increment the floor number and a step 7 will rotate the floor pointer left (to the next higher floor) and a test 8 will determine that the floor number is not yet equal to the highest floor so that the process will be repeated. If there is an up hall call at some floor, when that floor is under consideration, test 5 will be affirmative and will cause the assigner routine of FIGS. 7–12 to be performed. As is described with respect thereto hereinafter, that routine determines the car which should be assigned to the call in view of a variety of system conditions, on a relative basis, for maximizing overall system response considerations. When that subroutine 9 is completed, if the last car to have been assigned to the call (P LAST) is the same as the car which has been assigned the call by the assigner routine in step 9, a test 10 if affirmative, indicating that the call assignment should be left as is. But if the up hall call is assigned for the first time, or reassigned to a different car after having previously been assigned, then test 10 will be negative and a step 11 will cause the up call to be assigned to the car determined best for it by the assigner routine 9, by having the map of assigned up calls for the car designated by the assigner program (KAR) ORed with the floor pointer which indicates the floor number under consideration and therefore the floor at which the assigned up call has been made. In step 12, any previous assignment is eliminated by resetting the assigned up call for the car which previously had it (P LAST). And then the next floor is considered in turn. When all of the floors have been considered, test 8 will be affirmative, and step 13 will ensure that the floor pointer is set to the highest floor of the building. Then the up call flag is reset so as to designate the case of considering down hall calls in step 14. Starting at the highest floor, test 15 will determine if there is a down call for the highest floor. If not, the remaining functions for that floor are bypassed by a negative result of test 15, so that steps 16 and 17 will cause the next lower floor to be considered until such time as a test 18 indicates that the lowest floor has been considered. For any floor in which there is a down hall call registered, test 15 will be affirmative and cause the assigner routine 9 to be performed as is described hereinafter. And a test 19 determines if a new or changed assignment has been made. If it has, test 19 is negative so that the call is assigned to the car designated by the assigner routine (KAR) in step 20, and step 21 causes it to be removed from any car to which it may have previously been assigned. When all of the floors have had their up hall calls and down hall calls considered, test 18 is affirmative and the program will continue with the hall stop command routine described with respect to FIG. 13, through a transfer point 19.

Figure 7:
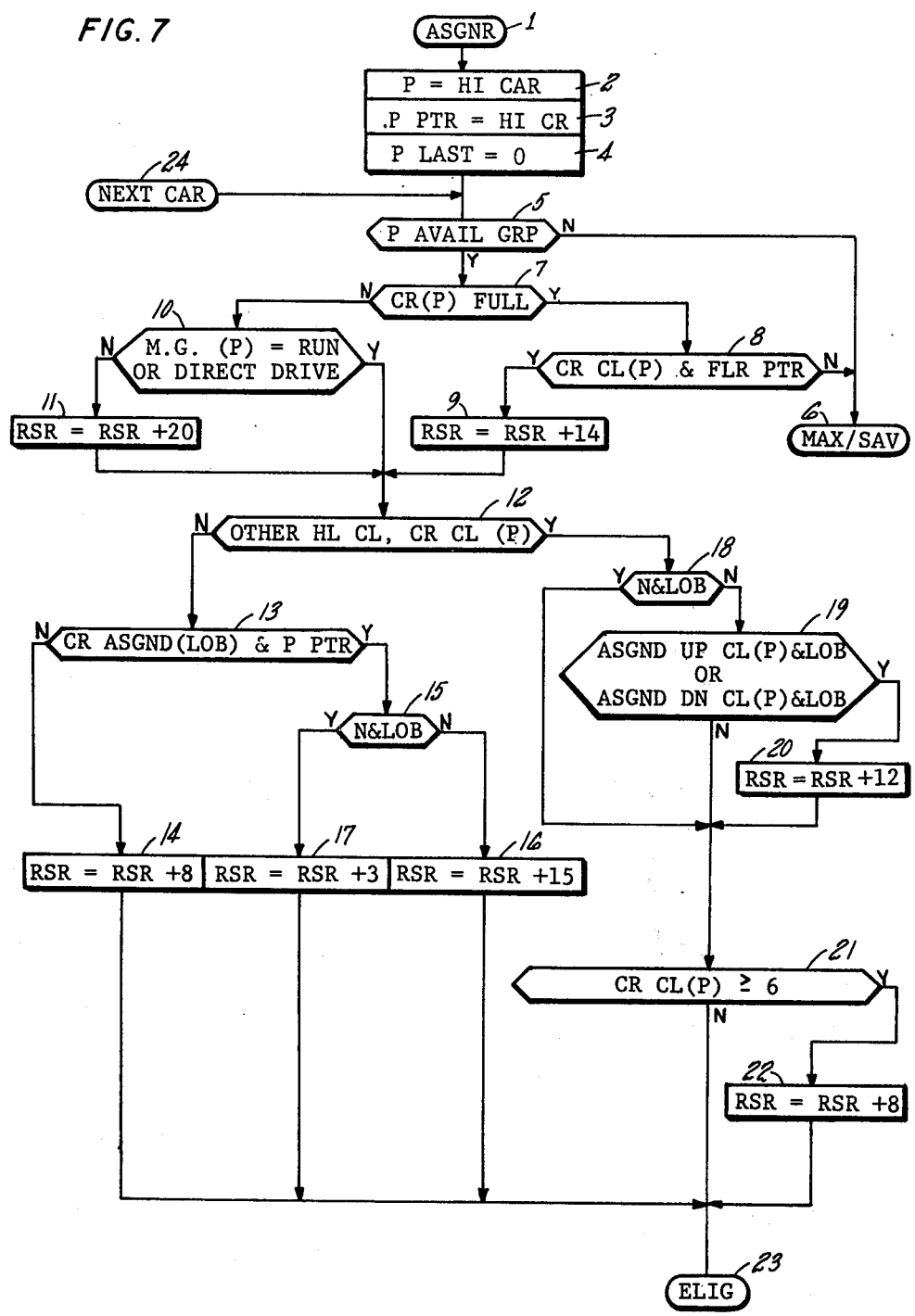
FIGS. 7-12 are a logic flow diagram of an assigner subroutine which may be employed in the hall call assignment routine of FIG. 6.

The assigner routine utilized in the hall call assignment routine of FIG. 6 is entered through an entry point 1 in FIG. 7. Steps 2 and 3 establish a car number and car pointer to indicate the highest numbered car in the building, and a step 4 resets an indication of the last car to have a given call (P LAST) to zero. Then a test 5 determines if the car under consideration is amongst those in the map of cars available to satisfy demand in the group and if the car is not available, most of the considerations with respect to this car are bypassed by reaching a transfer point 6 which just calls into play wrapping up operations, as are described with respect to FIG. M11, hereinafter. But if the car is available to satisfy demand in the group, a test 7 determines if the car is full (from the map of cars determined to be fully loaded, as derived by communications from all of the cars being combined into a single map within the group controller. A negative result from test 7 could be achieved by ANDing the P pointer with a map of cars fully loaded. If the car under consideration is fully loaded, test 7 is affirmative and test 8 determines whether or not there is a car call (one established by the passenger within the car under consideration) for the floor currently under consideration. If not, then the fact that the car is full and won't stop at the floor landing corresponding to the floor call under consideration causes this car to be effectively eliminated for consideration in assigning the present call by means of the transfer point 6. But if this car will stop at the floor where the call being considered has been registered, then test 8 will be affirmative and a relative system response number will have a value added to it indicative of the fact that this car is not highly favored for the car call under consideration, but may in fact be the best car, in dependence upon other factors. Thus, step 9 will add a value such as 14 to the relative system response for this particular car with respect to the car call under consideration in the present performance of the assigner routine.

In FIG. 7, if test 7 had been negative indicating that the car is not full, then a test 10 will determine whether the motor generator set (such as the well known Ward Leonard System) for the car under consideration is running or not, as is indicated in a map of running motor generator sets established in the group controller based upon the conditions with respect to each car having been communicated to the group controller during normal group/car communications. If a particular elevator car is fitted with a solid state direct drive system, not having a motor generator set, then the bit respecting that car in the map of running motor generator sets may be continuously maintained as a one. If a car has a motor generator set which is not running, test 10 will be negative and the relative system response factor will have 20 added to it, providing a disfavorable relative factor with respect to cars which would require starting their motor generator sets before answering this particular call. This will save considerable energy, and is included in the factor even if the car with its motor generator stopped could be started up and answer the call more quickly (indeed even though the car may be physically located at the same landing). Thus, an energy saving is effected by the test 10. Notice that the tests 10 and 8 are alternative since a running car cannot have a stopped motor generator set and since a car with its motor generator set stopped cannot be full.

In FIG. 7, a test 12 determines if the masks of hall calls and car calls for car P have any ONEs in them at all. If they do, that indicates that the car has further demand and will be moving about the building in order to satisfy the tasks which it already has. On the other hand, if test 12 is negative, this indicates a car that might be able to go to rest, thus saving energy if other cars can do the work of answering the hall call under consideration, while they are doing other work which requires them to be running. Therefore, if the car in consideration has no other calls, a test 13 will determine whether the car is assigned to the lobby floor. If not, a penalty of about 8 as added to the relative system response factor for this car with respect to this call. But if the car is assigned to the lobby floor, then a test 15 will determine if the call under consideration is the lobby floor. If not, a step 16 assigns a relatively high penalty of 15 seconds by adding that to the relative system response factor, because the lobby floor is to be favored and the call under consideration could likely be handled by cars two or three floors away from the lobby; if they can do so within 15 seconds of this car being able to do so then this car will not pick up the call; but only if all the other factors indicate that this car might reach the call only 15 seconds after some other car, then this car will be disfavored for answering that call by that amount. On the other hand, if test 15 indicates that the current call being considered for assignment is at the lobby, then only a small penalty, of about 3 seconds, is indicated for this car, relating to the fact that if there is already another car at the lobby, it is preferred to leave this car assigned to the lobby, rather than confusing passengers by switching car lanterns.

In FIG. 7, if test 12 determines that this car does have other car calls or hall calls, a test 18 determines whether the hall call currently being assigned is at the lobby. If it is not, test 18 is negative and a test 19 determines whether this car already had a lobby call. If it does, the lobby call is to be given favoritism because most traffic in a building passes through the lobby and the greatest demand is at the lobby so that there is a penalty of about 12 seconds applied to this car with respect to this call in a step 20. But if the calls already assigned to this car do not include a lobby call, there is no penalty assigned; and similarly, if test 18 indicates that the lobby floor is under consideration, no additional penalty is provided. Then a test 21 determines if this car has more than six car calls registered within it. If it does, this is an indication that the car is rather busy and has a number of stops to make. In addition to the fact that it will take more time to reach the car in question, it is also true that the likelihood of the conditions for this car remaining constant and therefore being a viable car for assignment are liable to change. And, the time in which the call is serviced, not only the time when the call will be answered, but the time when the passenger who made the call will be delivered to a final destination, is bound to be longer in a car which already has a larger number of assigned calls than otherwise. Therefore, if test 21 is affirmative, a moderate penalty of about 8 seconds is added to the relative system response for this car in a step 22. But if the car has less than six calls, it is known to be a running car which has to be in service anyway and is therefore not disfavored insofar as answering of this call is concerned. When all of the factors of FIG. 7 have been completed with respect to this car, the assigner program contiues by transfer point 23 in FIG. 7 and entry point 1 in FIG. 8 to a portion of the program which determines the eligibility of the car for the call in question.

Figure 8:
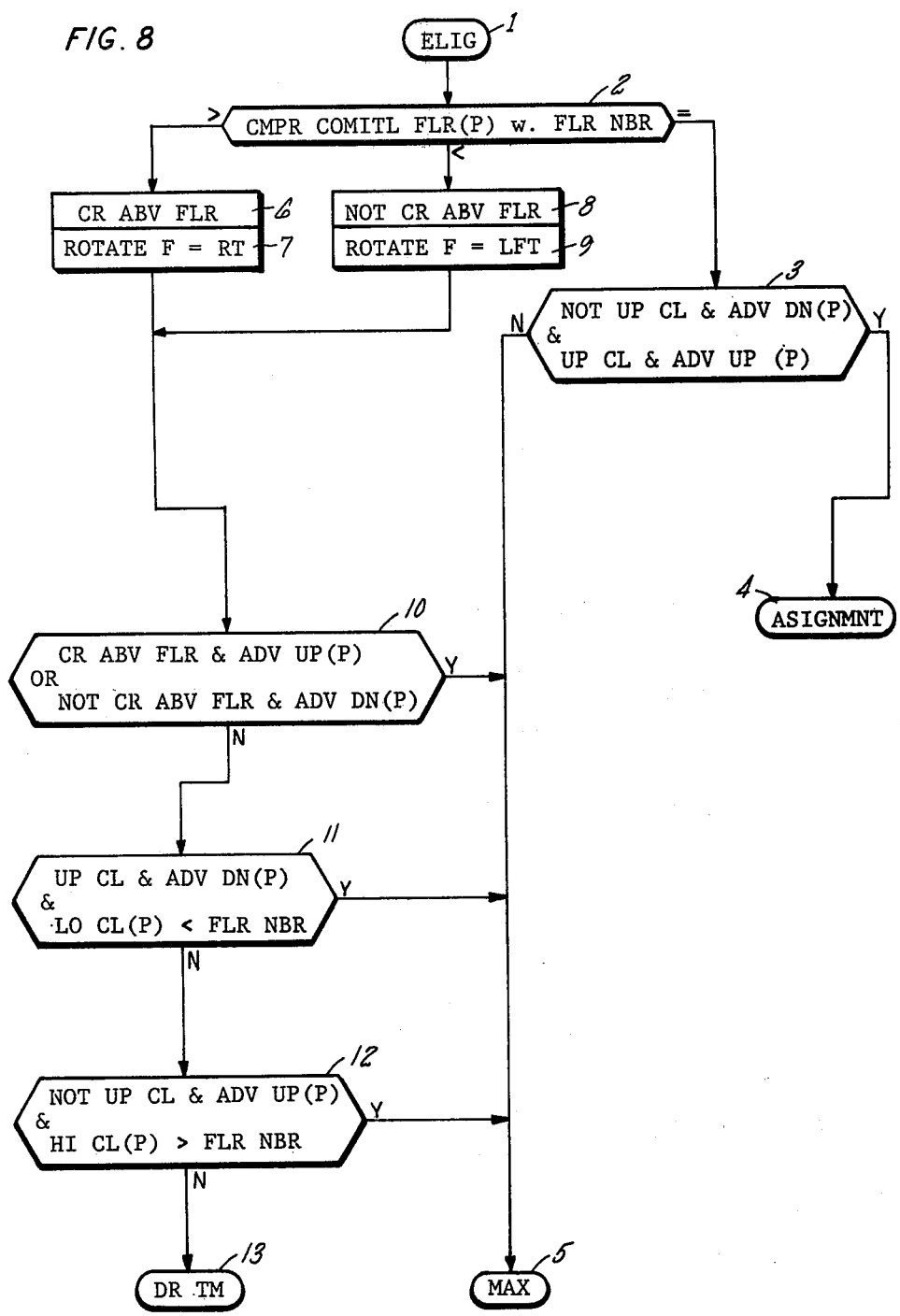

In FIG. 8, a test 2 compares the committable floor of the car under question with the floor number of the hall call under question. If the car has a committable position equal to the floor number, then it will either be a rather favored car (since it is at the desired floor) if it is running in the same direction as the direction of the hall call under consideration, or it will be an essentially impossible car if it is going in the opposite direction from the direction of the hall call. Thus, a test 3 determines if the call under consideration is a down call (not up call) and the car is advancing downwardly, or if the car is an up call and the car is advancing upwardly. If so, test 3 is affirmative and a transfer point 4 will cause the program to branch to the assignment portion thereof described with respect to FIG. 11 hereinafter. But if the directions are opposite, test 3 will be negative and the car is given a maximum relative system response factor by passing through the branch point 5 to a part of the program where a maximum relative system response is assigned, as described with respect to FIG. 11 hereinafter.

In FIG. 8, if the comparison of test 2 indicates that the committable position of the car in question is above the floor of the call being assigned, then a car above floor flag is set in a step 6 and a rotation flag for an F pointer (which identifies floors in a small subroutine described with respect to FIG. 10 hereinafter) is set to rotate the pointer to the right, from higher floors to lower floors; but if test 2 indicates that the committable position of the car under consideration is less than the floor number of the call under consideration, then a step 8 resets the car above floor flag and a step 9 establishes that F pointer rotation should be to the left, or higher floors, as is described more fully hereinafter with respect to FIG. 10. In FIG. 8, a test 10 determines if the car is above the floor and going upwardly, or below the floor and advancing downwardly, in either case indicating that the car is going away from the call. In test 11, if the car is going down, and it has a low call below the hall call under consideration, and an up call must be responded to, the car cannot stop and change direction to handle the up call; it is therefore considered as going down beyond an up call. In test 12, the opposite case from that of test 11 is determined. A down call cannot be answered by a car traveling upward to a call higher than the floor number of the call being assigned and is therefore going up beyond a down call. Affirmative results of tests 10-12 will cause the program to transfer to a point where a maximum response factor penalty is indicated for this car with respect to the call under consideration, through branch point 5. Otherwise, the program transfers to a portion thereof which determines factors relating to the time for servicing existing calls in dependence upon conditions of the car, through a transfer point 13.

Figure 9:
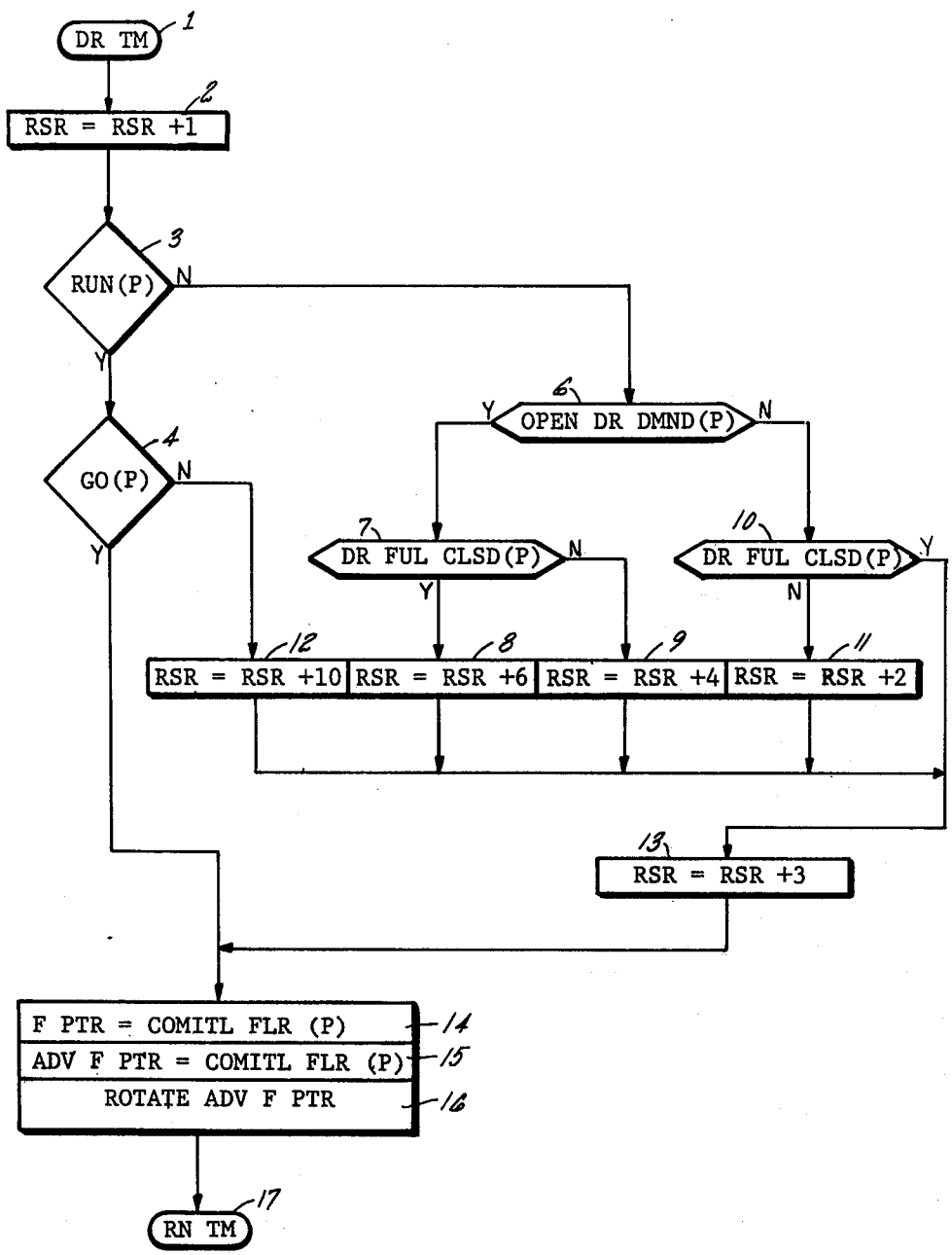

In FIG. 9, consideration of time to operate the doors and the like at landings is given in a portion of the routine reached through an entry point 1. In a step 2, the relative system response factor is incremented by one, since any car which could have reached this part of the program in its consideration, must at least pass one floor at high speed, which may take on the order of 1 second. As described elsewhere herein, of course, if the speeds indicate higher or lower elapsed time for a high speed pass of a floor, or if other parameters or values are assigned, then this may be set to a different value in accordance with the particular manner in which the invention is implemented.

In FIG. 9, a test 3 determins if the car in question is running. If it is, a test 4 determines if it is going to remain running by virtue of its go signal still being indicated to the group controller. If the car is running and will remain running, consideration of door condition can be bypassed. But if step 3 is negative, indicating that the car is not running, then the car is stopped. And a test 6 determines if the door is commanded to be open. If so, a test 7 determines if the door is still fully closed; if it is fully closed, then a time of 6 seconds is added since a full door opening will be required. But if the door is not fully closed as indicated in test 7 but has been commanded to open as indicated in test 6, then the door is necessarily opening and a smaller time of about 4 seconds is added in a step 9.

If step 6 in FIG. 9 is negative, meaning the door is not under a command to open, then a test 10 will determine if the door is fully closed. If it is, there is not time required with respect to the door; but if it is not yet fully closed, then a very small time of about 2 seconds is provided to the relative system response for this car with respect to this call, in a step 11.

If test 3 in FIG. 9 is affirmative meaning that the car is running, but if it no longer has a go signal indicating that the car is stopping, test 4 will be negative and a complete stop time of 10 seconds is provided in step 12 since the stopping, opening, and closing of the doors, and the door open time will be on the order of 10 seconds for this car, before it can proceed toward answering any further calls. If either test 3 or test 4 indicates that the car in question must make or finish a floor landing stop before it could proceed toward answering the call under consideration, the relative system response factor is increased by about 3 seconds in a step 13 to accommodate the slower speed of the car as it slows down to a stop and as it accelerates from a stop in contrast with the roughly 1 second required for a maximum speed bypass of a floor where no stop is considered.

In FIG. 9, when door considerations are completed, initial steps required in order to estimate run time of the given car to the hall call in question are made. In a step 14, a special limited use floor pointer, called an F pointer, is set to the committable floor of the car under consideration, and a second special floor pointer, which is ultimately advanced to be one floor ahead of the F pointer, referred to herein as an advance F pointer, is also set to the committable floor position in a step 15. The advance F pointer is rotated in step 16 in the direction indicated by the rotate F factor established in either steps 7 or 9 as described with respect to FIG. 8 hereinbefore. Thus, whether the F pointer is to have lower or higher floors, the advance pointer will get one step ahead of it at this point. And then the program advances through a transfer point 17 to the run time calculations which are entered through an entry point 1 in FIG. 10.

Figure 10:
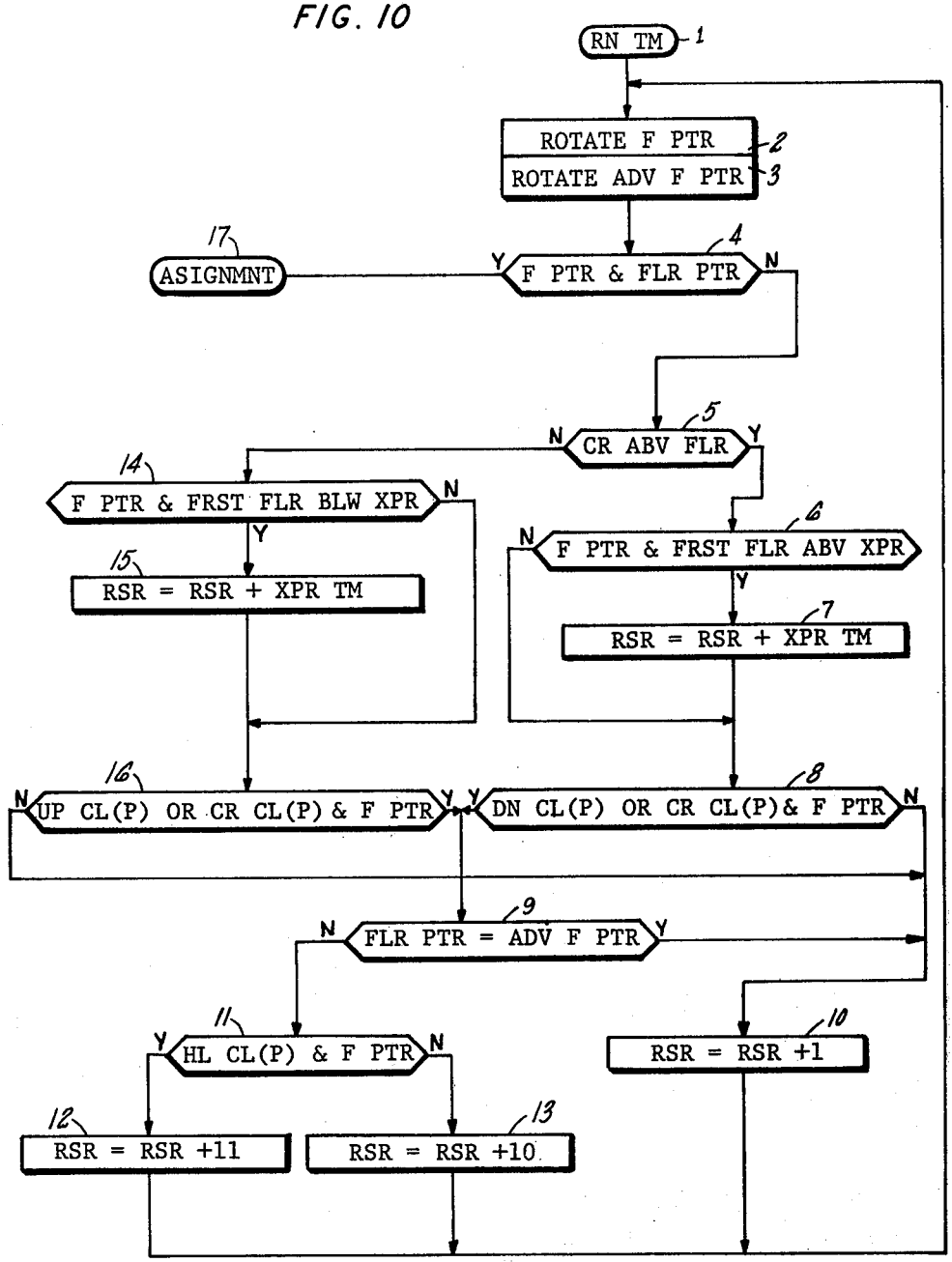

In FIG. 10, steps 2 and 3 rotate both the F pointer and the advance F pointer so as to indicate a lower floor in the case where the car is above the floor of the call under consideration, so that the expected run time of the car as it proceeds from its present committable position downwardly to the floor of the hall call under consideration can be estimated. Or if the car is below the floor of the hall call under consideration, the pointers will be rotated for increasing floors so as to scan from the present committable floor of the car upwardly to the hall call under consideration.

In FIG. 10, a test 4 determines if all the floors between the present position of the car and the floor of the hall call under consideration have been scanned or not. If they have, the program advances as is described hereinafter. For each floor between the present committable position of the car and the floor of the hall call being considered, a test 5 determines if the car has previously been determined to be above or below the floor by testing the car above floor flag. If the car is above the floor, then a test 6 is made to determine if the floor being scanned in this portion of the subroutine is the first floor above an express zone. If it is, test 6 is affirmative and a step 7 will add to the response factor, the time which it takes to run high speed through an express zone, such as 1 second for each of the floors in an express zone. This is a number which is pre-established with respect to any given installation and simply is looked up in a suitable table. Then, a test 8 determines if the car which is above the floor of the call in consideration, and therefore can answer only down calls and car calls, has any such calls registered for it at the floor currently being scanned. If it does, a test 9 determines, by means of the advance F pointer, whether the floor whose call is under consideration is one floor ahead of the floor being scanned. If so, an affirmative result from test 9 indicates that the car being considered for a particular floor call has an assigned call at a floor adjacent to the floor under consideration, which it will reach before it reaches the floor under consideration. In such case, a step 10 will assign a time of only 1 second to account for only the high speed run time past the floor; the remaining time for stopping and servicing passengers (10 seconds) being ignored, thereby favoring assignment of the contiguous hall call, in accordance with the invention described and claimed in a commonly owned, copending U.S. patent application filed on even date herewith by Mendelsohn and Bittar, Ser. No. 099,395. If, on the other hand, test 9 is negative, then a test 11 is performed to determine whether a hall call is involved (whether a car call was involved or not in test 8). If a hall call is involved, then a step 12 adds a time of about 11 seconds to this car with respect to this call, which represents 7 seconds necesary to open and close the doors and service the call, and 4 seconds increased running time due to the need to decelerate and reaccelerate the car. But if test 11 determines that the involved call of test 8 is not a hall call, then it is a car call and a step 13 provides a time of 10 seconds, since a car call takes about 1 second less than a hall call to service (due to the fact that the passenger getting off the elevator is waiting for the door to open in contrast with a passenger in a hallway who may have to find the serving elevator and walk toward it).

In a similar fashion, if the car is not above the floor as determined in test 5, a test 14 determines if the floor being considered for calls between the car involved and the hall call being assigned is the first floor below an express zone. If it is, then the relative system response factor has added to it the time necessary to run the express zone, which may be on the order of 1 second per floor, in a step 15. Then a test 16 determines whether there is an up call or a car call at the floor under consideration, and if there is, the contiguous call test 9 is made as described hereinbefore. And if that is successful, or if there are no calls at the floor under consideration, then a time of about 1 second is assigned, as is described with respect to down calls, hereinbefore. Similarly, if test 9 is negative, then either 10 or 11 seconds will be added in the case of car calls or hall calls, in step 12 or 13, respectively. When each floor, represented by the F pointer and the advance F pointer, has been given consideration with respect to each car, test 4 will be affirmative, and the program will continue in the assignment portion thereof by means of a transfer point 17.

Figure 11:
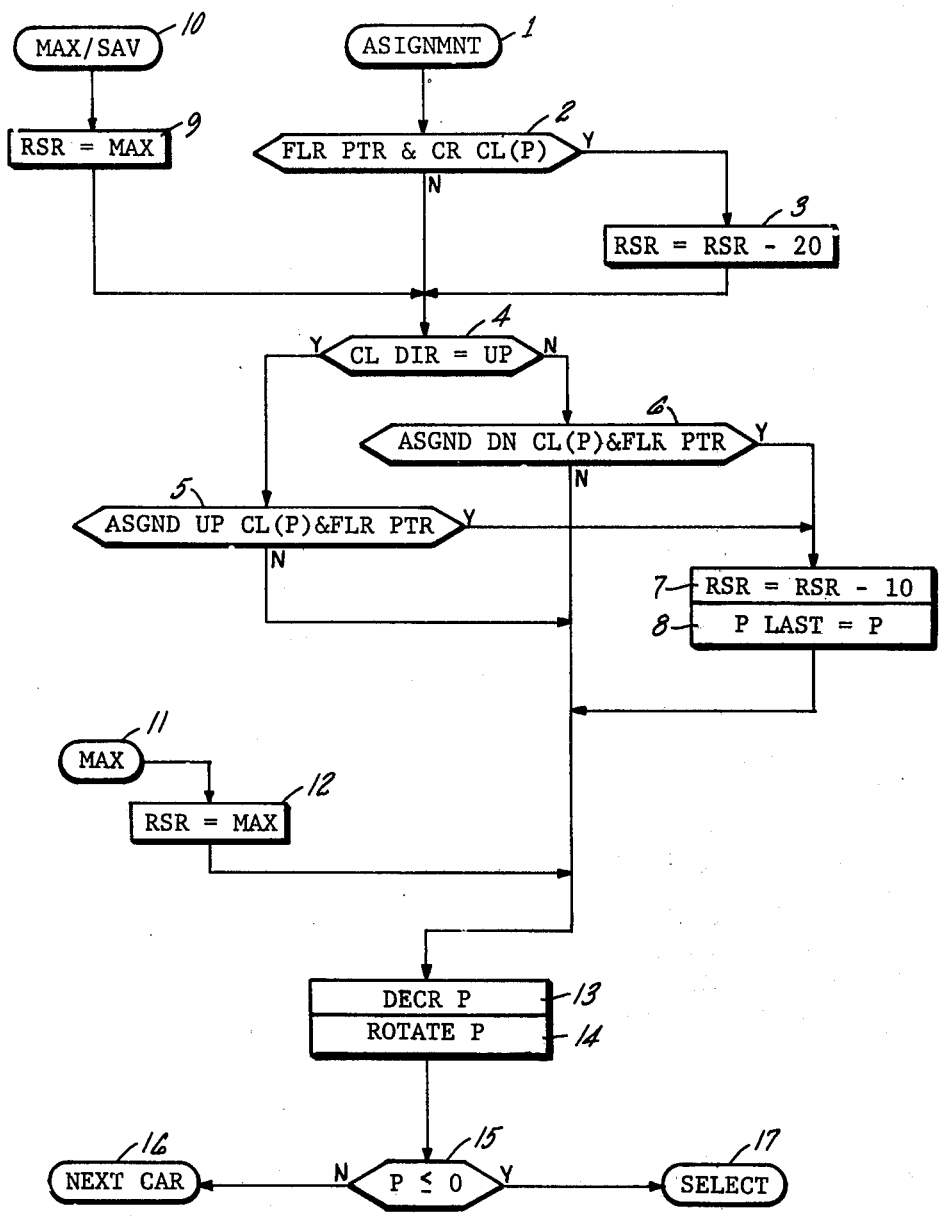

After conclusion of calculation of the run times in FIG. 10, the program continues in FIG. 11 through the assignment transfer point 1, and a test 2 determines if there is a car call coincident with the floor call under consideration, which, if there is, must be of a car traveling in the same direction (up or down) as the hall call being considered, because any car not traveling in the right direction cannot possibly have any calls that will coincide, due to the fact that all car calls are ahead of the car, and any car which is not approaching the hall call under consideration from the right direction will be eliminated in the eligibility portion of the program as described with respect to FIG. 8 hereinbefore. If test 2 is affirmative, this is a very favorable situation since the car must stop at that floor anyway, so this car is favored by a step 3 which subtracts about 20 seconds from the relative system response factor for this car in consideration of the hall call being assigned. Then, a test 4 determines if the call direction is up. If so, the assigned up calls for the car P, which is a map of ones indicating every up call which has been assigned to car P, is compared with the floor pointer to see if there is an assigned up call for this car at the floor under consideraton. Similarly, if test 4 is negative, a test 6 makes the same consideration with respect to down calls. If either test 5 or 6 is affirmative, depending on the direction of the call under question, this means that this car has previously had this particular call assigned to it, having been so assigned in a previous pass through the hall call assignment routine. In such case, this car is favored to retain the call by a step 7 which subtracts about 10 seconds from the relative system response which has been accumulated for the car with respect to the call. This provides preference to a car to which the call has previously been assigned, in accordance with the invention herein which is analyzed more fully hereinafter. And, to keep track of the fact that this car previously had this call, P LAST is set equal to P in a step 8, for use as is described hereinbefore with respect to FIG. 6.

In FIG. 11, under certain considerations of a car not being able to handle the call under consideration, the relative system response factor for that car may be set to a maximum value (such as 256 seconds) by a step 9 (top of FIG. 11) which is reached through a MAX/SAVE transfer point 10 (which is the same as the transfer point 6 in FIG. 7). In such cases, the car has either become unavailable to the group or has become full; since it could possibly have previously had the call in question, the functions described with respect to test 4 through step 8 are performed with respect to such car, even though it is extremely unlikely that such car could retain the assignment of this call.

In FIG. 11, a transfer point 11 which causes a step 12 to set the relative system response for the car under question to the maximum value may be reached through a transfer point 5 in FIG. 8, which means that the car is not eligible to handle the call under question. And since such cars couldn't possibly have had this call assigned to them in a previous pass, the functions of test 4 through step 8 need not be performed with respect thereto.

At this point in the program, the relative system response for the particular car under consideration has been fully accumulated. Then, steps 13 and 14 decrement the P number and rotate the P pointer so as to identify the next lowest numbered car in the building for consideration of its relative system response factor. A test 15 determines if the lowest car has been considered, and if not, the assigner routine, beginning on FIG. 7, is reached through a transfer point 16 on FIG. 11 and a transfer point 24 on FIG. 7 so that the next subsequent car will have a relative system response factor assigned to it with respect to the particular call under consideration. When all the cars have been given consideration with respect to the particular call in question, the program continues by transfer point 17 on FIG. 11 and entry point 1 on FIG. 12 to the select portion of the assigner routine.

Figure 12:
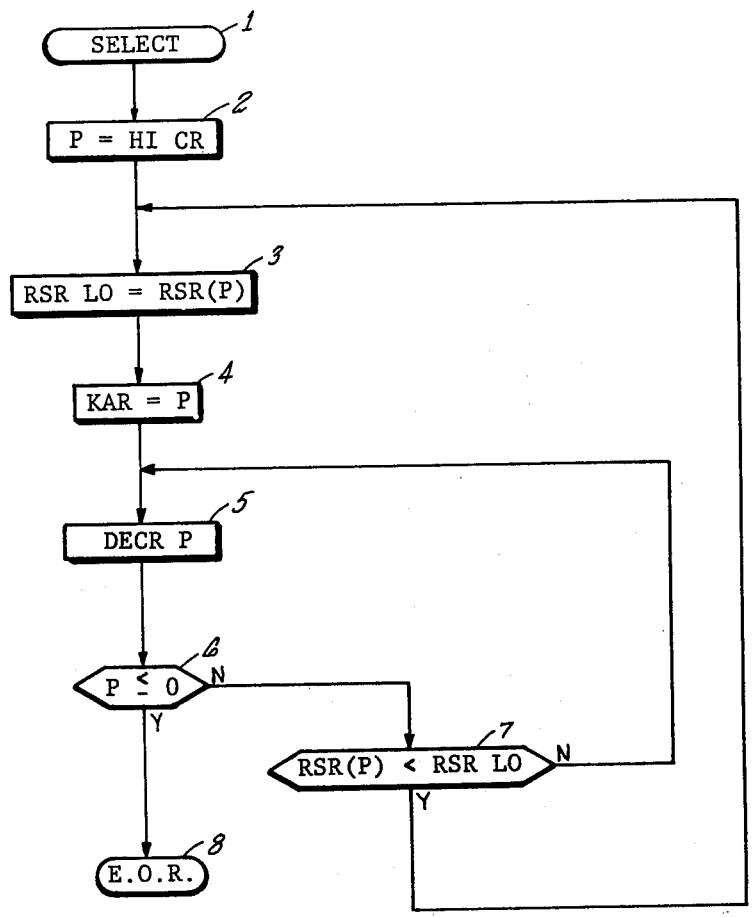

In FIG. 12, the P number is no longer being used for keeping track of cars that had their relative system responses calculated, and is set in step 2 to be equal to the high car. All of the cars will now be scanned to see which one has the lowest relative system response factor and thereby have the call assigned to it. In a step 3 the relative system response low buffer is set to equal the relative system response of car P. A KAR buffer is set equal to the car number of car P; this identifies the car whose relative system response has last been established in the relative system response low buffer in step 3. Then in a step 5 the P number is decremented and if a test 6 determines that the lowest numbered car in the building has not yet been considered, a test 7 compares the relative system response of the presently considered car (P) to see if it is less than that which has previously been stored in a relative system response low buffer by step 3. If test 7 is affirmative, the relative system response low buffer will be updated to a new, lower amount corresponding to the car P, in step 3. If not, this car is ignored and the P number is decremented in step 5. When step 6 is finally affirmative, all the cars will have been polled, the lowest relative system response for any of the cars will be set in the relative system response low buffer, and the identity of the car having such lowest response will be set in the KAR buffer 4. And then, the assigner routine ends through an end of routine point 8, which causes the program to continue with the hall call assignment routine, described hereinbefore with respect to FIG. 6, specifically picking up at either test 10 or test 19 to determine whether the car to which the call has just been assigned (KAR) is equal to the car which previously had the call (P LAST).

Conclusion of the hall assignment routine of FIG. 6 will cause the program to advance through the transfer point 19 to the call to car hall stop command routine of FIG. 13.

In FIG. 13, entry through an entry point 1 leads to steps 2 and 3 which establish a P number and P pointer as the highest numbered car in the building, and steps 4 and 5 which cause the up hall stop and down hall stop maps to be set to all zeros. Then steps 6 and 7 set a floor pointer and floor number to the committable floor of the car (P) under consideration. Then a test 8 determines if the car is at the lowest floor, and if not, a test 9 compares the map of down calls assigned to the car under consideration with the floor under consideration (the committable floor of the car under consideration) and if they are the same, a step 10 updates a map of down hall stops by ORing to itself the P pointer; this provides the map of down hall stops, which is changed in every pass through the routine, with a bit in the position of car P, indicating that car P is one of the cars having a down hall stop during this pass through the routine. Then a test 11 determines if the car in question is issuing a down call reset; if it is, the down hall call map has the bit relating to the floor in question (the committable floor of P) reset by ANDing with the complement of the floor pointer, and the down call light at floor N is turned off, in steps 12 and 13. Then a test 14 determines if the floor in question is the top floor; if not, or if test 8 had determined that the floor number was the lowest floor, then a test 15 determines if this car has an up call at the current floor. If so, an up hall stop is added to the up hall stop map in a step 16. If the car is issuing a reset for an up call as determined in test 17, then the up call is reset and the call light is turned off in steps 18 and 19.

In FIG. 13, completion of steps 13 and/or 19 has made provision for the fact that the car should be commanded to stop for a hall call at its next committable floor, or that it has answered a call at its committable floor which is then reset. Then, the next car is sequence is identified by decrementing the P number and rotating the P pointer in steps 20 and 21 to perform these same functions for the next lower numbered car in the building, if a test 22 indicates that all cars have not yet been considered, and to transfer the program to the cars to calls group demand routine of FIG. 14 through a transfer point 23, after all cars have been considered.

In FIG. 14, the cars to calls group demand routine is entered through an entry point 1 and the highest car in the building is set for consideration by setting a P number and a P pointer to the highest numbered car in the building, in steps 2 and 3. Then a group higher demand map and a group lower demand map are set to zeros in steps 4 and 5. A step 6 sets the floor pointer to the committable floor of the car under consideration and a step 7 prepares a map of assigned hall calls for the car under consideration as being the logical OR of assigned up calls and assigned down calls for the car under consideration.

In FIG. 14, a test 8 examines the map of hall calls for the car under consideration to determine if it is all zeros above the floor number (N). If it is not all zeros, that means there are calls above the committable position of the car and the car should continue to advance upwardly in order to service those calls. Thus, a negative response from test 8 will cause a step 9 to update the map of group higher demands, there being one bit in the map for each car, to include a bit in the bit position for the car under consideration. This is done by ORing the group higher demand map (previously set to zero at the start of this routine) with the P pointer, which identifies the car under consideration. Then a test 10 determines if the map of hall calls assigned to this car (step 7 above) indicates no calls below the committable position. If that is not true, test 10 is negative so a step 11 will create lower demand for the car by updating the group lower demand map to include a bit for the car in question, by ORing that map with the P pointer. Then the next car is established for consideration by decrementing the P number and rotating the P pointer in steps 12 and 13, and if all the cars have not yet been given consideration as determined in a test 14, steps 6 through 13 are repeated. When all cars have been considered, so that the group lower demand map and the group higher demand map includes bits for all cars requiring either higher or lower travel to service their calls, step 14 is affirmative and the overall program of the group controller is returend to through a transfer point 15. As referred to hereinbefore with respect to FIG. 3, this will cause discrete outputs and control of lights at the halls and lobby panel to be accomplished by a suitable routine 22, preparing information to be sent to the cars in a routine 23, and communicating with the cars in a communication routine 24. And then the entire program of FIG. 3 is repeated again.

In FIG. 11, the fact that a particular car has previously been assigned the call in question is very significant, and it causes a decrement in the relative system response of 10 seconds. In some cases, this could result in negative number, but since negative numbers are lower than positive numbers in assigned arithemetic, this is irrelevant.

One of the factors concerning the favoritism applied to a car which previously has been assigned the call is that it can be utilized to alter the nature of response in an elevator system. For instance, in some countries custom prefers to have each registered hall call immediately assigned to a car, and a particular car which is going to respond to that call being immediately displayed at the floor landing. In such systems (as in other sytems generally known in the art) no reassignment of the call will ever occur unless the call is outstanding for an excessive period of time (such as two minutes). Then, extraordinary action is taken such as to create some form of demand to answer the call, assign a car specially on an emergency basis to answer the call, or the like. In the present case, the factor added in step 7 of FIG. 11, called the previous assignment factor, can be adjusted to a maximum value, thereby ensuring that no other car will ever have the call assigned to it, once the first assignment is made by virtue of the relative system response factors included herein. On the other hand, the previous assignment factor can be low, such as 10 seconds, which permits changing the call assignment to different cars repetitively. Or some middle ground may be utilized. For instance, if a previous assignment factor on the order of 45 seconds were subtracted from the relative system response for the first car to receive the assignment in step 7 of FIG. 11, then the particular car in question could probably keep the assignment unless the calculations of its anticipated time, to respond and other system response factors became large with respect to other cars. Thus, a previous assignment factor (30 or 40 seconds) can probably be found which will cause the car to be assigned to only one car in most cases, but will shift it to a second car in those cases when the first car later becomes unsuited to the call.

The previous assignment factor of FIG. 11 also provides for an inherent solution to equal races between two cars which are in exactly the same relative system response category. Although two cars need not be in identical situations to have the same relative system response, it is likely that several cars may have the same relative system repsonse aggregate number as a consequence of either similar or different circumstances. In such cases, any mechanism which scans cars in a given direction is liable to cause one car to win the races and to do all the work. This does not distribute the use of the cars evenly among the various cars of the building, causing one particular car to have excessive wear and require excessive maintenance. Instead, the desired mode is to have cars wearing evenly and requiring only an even, regular maintenance schedule, to the extent possible. This previous assignment factor, in step 7 of FIG. 11, tends to cause any car first found to be in the best condition to answer a call, to retain it. This even makes it less likely that the previous assignment factor will itself cause an equal race between two cars, one of which has a 10 point lower relative sytem response, and the other of which has previously been assigned to the call. This becomes particularly important when all of the cars are at rest, and/or all of their motor generator sets may be turned off. In such case, if the cars are distributed around the building by virtue of the assignment of cars to calls (routines 14–17 in FIG. 3), then any call which falls between two cars would have a race condition, and one of them would win it. But before that call could be answered, or any response could be had from the assigned car that it was starting up to answer the call, the other car could have the call assigned to it. Ultimately, transferring the call back and forth between two cars would cause both of them to start their motor generator sets and both to approch the call, and at the last second, depending upon happenstance, one of them will get the hall stop command before the next one has the call reassigned to it. This leaves running car with nothing to do which is very wasteful, and has caused two cars to start up to do the work of one. Therefore, the previous assignment factor can be extremely important in tailoring the response of the system to a large number of frequently occurring situations.

The invention provides the mechanism for saving energy in a variety of ways, such as by not allowing call behind response service (not picking up down calls with a car traveling up) even though both the car and the call may be at the highest part of the building and the rest of the cars may be at the lowest part of the building. If however, the car does change direction and becomes very close to the call, then it can be assigned to it later. Thus, there is an energy saving in reevaluating the assignment of calls to cars every fraction of a second (such as 200 milliseconds).

The present invention provides assignment of any unanswered hall call to a car, in dependence upon a wide variety of relative system response considerations, which go far beyond how quickly any particular car may reach a particular call. Thus, the first assignment of the call made to a car is a good one, better than has heretofore been available in the art. In addition, however, the present invention reevaluates the assignments, and will reassign to a different car any call which the system response factors indicate should better be handled by another car in order to effectuate the purposes of the philosophy of overall system operation. One aspect of the invention is the reevaluation of every call relative to the assignment which may be made of it, at any moment, not in contrast with any previously assignment made of it, and not even with respect to any previously assigned car capability or system response evaluation with respect to that call. Thus, the present invention does not compare the assignment of any given call to a particular car with the assignment of that call to the previously assigned car, insofar as the reevaluation does not employ the factors used in the previous assignment of the call to the car to which it was previously asigned. Stated alternatively, the present invention does not assign a call to a car, and then determine system response factors for assigning that call to other cars for comparison with those system response factors which initially cause the call to be assigned to the first car. What it does is continuously reevaluate not only other cars, but all of the cars; and it does this reevaluation with completely updated information with respect to all of the cars, rather than with respect to information which may have previously been used to assign the call to any given car.

The feature of potentially reassigning a call, time after time, in a time frame, such as a fraction of a second, which is very small in contrast with the time it takes for a car to run past a stop, and is orders of magnitude smaller than the time that it may take cars to respond to such calls, can be effected only if the reaction on the part of any hall landing or any car is withheld until the last posible assignment or potential reassignment has been made. The invention provides the last-second action of group hall stops (FIG. 13) and call cancellations, so that such assignments are not acted on until the committable car position for any car having assignment of the call requires that a stop command be ordered for that car to answer the call. The calls can therefore be reevaluated, and possibly reassigned, over and over again, with continuously updated information, since they are not acted upon until the last moment.

And the preference factor (step 7, FIG. 11) provides a hysteresis effect so that cars with equal relative system response factor summations will not exchange a call, back and forth, until the last cycle. This provides updated, repetitive hall call assignments without any adverse effects.

All of the relative system response factors, whether they be penalties or preferences, or estimated times to operate or run, may be varied widely from those shown herein to provide any scheme of system response deemed suitble in any particular system where the invention is employed.

This invention may be employed in systems which do not use the relative system response factors in assigning calls, such as fastest-response time estimating systems, or other systems, known to the prior art.

Similarly, although the invention has been shown and described with respect to exemplary embodiments thereof, it should be understood by those skilled in the art that the foregoing and various other changes, omissions and additions may be made therein and thereto without departing from the spirit and the scope of the invention.

I claim:

1. An elevator system including a group of elevators for servicing a plurality of floor landings in a building, comprising:
   group controller means, including hall call means for registering calls for up and down service at each of said landings, for exchanging signals with each of said elevators, and for controlling the operation of said elevators in response to said hall call means and signals received form said elevators;
   each of said elevators including a car, car motion means for providing and arresting the motion of said car, means registering for calls for service required by passengers therein, and a car controller means for providing signals indicative of conditions of said car, for controlling said car motion means to cause said car to move in a selected up or down direction and to stop in response to said signals indicative of conditions of said car and to signals received from said group controller means; characterized by said group controller means comprising signal processing means operative, within each one of a repetitive series of cycles occurring several times per second, in response to said signals indicative of conditions of each car and to all hall calls registered at said floor landings for assigning each hall call to one of said cars in dependence on the floor landing and direction of such hall call and the conditions of each car, as indicated during the cycle in which such assignment is made, for removing from each car, after making the assignment of any hall call in any cycle, the assignment of such hall call made to such car in a previous cycle which is assigned to a different car during such cycle, and for issuing a stop command to any car at the end of any cycle in which said signals indicative of conditions of such car indicate that its committable position coincides with the landing of a hall call assigned to it.

2. An elevator system according to claim 1 further characterized by said signal processing means comprising means for determining, with respect to the assignment of any hall call during each cycle, whether any of said cars has had said hall call assigned to it in the cycle preceding such cycle, and for providing preference to any car for any hall call which was assigned thereto in a cycle preceding such cycle.

3. An elevator system according to claim 1 further characterized by said signal processing means comprising means for assigning each of said registered hall calls to one of said cars on the basis of a summation of weighted factors indicative of the floor landing and direction of each hall call relative to conditions of each car, including direction of travel and floor position of each car, for determining, with respect to the assignment of any hall call during each cycle, whether any of said cars has had said hall call assigned to it in the cycle preceding such cycle, and for providing a weighted preference factor in said summation of weighted factors for any car with respect to any hall call assigned to it in a cycle preceding such cycle.

4. An elevator system according to any of claims 2 or 3 further characterized by said signal processing means comprising means for providing a weighted preference factor of a value having the same order of magnitude as the time it takes for one of said elevators to service a call at one of said landings.

5. An elevator system according to any of claims 2 or 3 further characterized by said signal processing means comprising means for providing a weighted preference factor of a value havng the same order of magnitude as the maximum time for which one of said hall calls is deemed to be unanswerable before reassigning said call.

6. An elevator system according to any of claims 2 or 3 further characterized by said signal processing means comprising means for providing a weighted preference factor of a value having the same order of magnitude as relationships between said hall call and the conditions of said car, provided to said group controller in such cycle, as would indicate a delay for such car to service said call of between five seconds and sixty seconds.

7. An elevator system according to any of claims 2 or 3 further characterized by said signal processing means comprising means for providing a weighted preference factor of a value having the same order of magnitude as the time it takes for one of said elevators to service from one to ten calls at said landings.

* * * * *